(12) United States Patent
Connelly et al.

(10) Patent No.: US 8,667,069 B1
(45) Date of Patent: Mar. 4, 2014

(54) FILTERING INCOMING MAILS

(75) Inventors: Michael Connelly, Philadelphia, PA (US); Alexander E. Quilici, Malibu, CA (US)

(73) Assignee: AOL Inc., Dulles, VA (US)

( * ) Notice: Subject to any disclaimer, the term of this patent is extended or adjusted under 35 U.S.C. 154(b) by 1070 days.

(21) Appl. No.: 12/121,268

(22) Filed: May 15, 2008

Related U.S. Application Data

(60) Provisional application No. 60/938,393, filed on May 16, 2007, provisional application No. 60/946,633, filed on Jun. 27, 2007.

(51) Int. Cl.
*G06F 15/16* (2006.01)

(52) U.S. Cl.
USPC .......................................... 709/206

(58) Field of Classification Search
USPC .......................................... 709/206
See application file for complete search history.

(56) References Cited

U.S. PATENT DOCUMENTS

| | | | |
|---|---|---|---|
| 5,999,932 A | 12/1999 | Paul | |
| 6,161,130 A | 12/2000 | Horvitz et al. | |
| 6,167,434 A | 12/2000 | Pang | |
| 6,266,692 B1 | 7/2001 | Greenstein | |
| 6,321,267 B1 | 11/2001 | Donaldson | |
| 6,393,465 B2 | 5/2002 | Leeds | |
| 6,405,319 B1 | 6/2002 | Arnold et al. | |
| 6,421,709 B1 | 7/2002 | McCormick et al. | |
| 6,453,327 B1 | 9/2002 | Nielsen | |
| 6,615,242 B1 | 9/2003 | Riemers | |
| 6,654,787 B1 | 11/2003 | Aronson et al. | |
| 6,748,422 B2 | 6/2004 | Morin et al. | |
| 6,779,021 B1 | 8/2004 | Bates et al. | |
| 6,829,631 B1 | 12/2004 | Forman et al. | |
| 6,868,498 B1 | 3/2005 | Katsikas | |
| 6,957,259 B1 | 10/2005 | Malik | |
| 7,058,684 B1 | 6/2006 | Ueda | |
| 7,072,942 B1 | 7/2006 | Maller | |
| 7,117,358 B2 | 10/2006 | Bandini et al. | |
| 7,149,778 B1 | 12/2006 | Patel et al. | |
| 7,467,212 B2 * | 12/2008 | Adams et al. | ................. 709/229 |
| 7,516,182 B2 | 4/2009 | Goldman | |
| 2002/0129111 A1 | 9/2002 | Cooper | |
| 2003/0009698 A1 | 1/2003 | Lindeman et al. | |
| 2005/0080856 A1 * | 4/2005 | Kirsch | .......................... 709/206 |

OTHER PUBLICATIONS http://razor.sourceforge.net/, Vipul's Razor, Jun. 24, 2002, 23 pages.
http://msnbc-cnet.com.com/2100-1023-937300.html?tag=rn, "Start-up wants your help to fight spam," CNET News.com Review-700XL, Jun. 19, 2002, 3 pages.

(Continued)

*Primary Examiner* — David X Yi

(74) *Attorney, Agent, or Firm* — Finnegan, Henderson, Farabow, Garrett & Dunner LLP

(57) ABSTRACT

Techniques are described for determining how to handle inbound messages based on feedback from users. Feedback may relate to content of inbound messages and/or a source of inbound messages. In addition, feedback may be dynamically filtered based on groups and message recipients may become affiliated with one or groups causing feedback associated with the one or more groups to apply to inbound messages they receive. In displaying messages, an indication of feedback associated with the messages may be displayed to the message recipient.

14 Claims, 18 Drawing Sheets

(56) References Cited

OTHER PUBLICATIONS http://msnbc-cnet.com.com/2100-1023-829399.html?tag=rn, "Net surfers set out to squelch spam," CNET News.com, Feb. 5, 2002, 4 pages.
http://msnbc-cnet.com.com/2104-10230938103.html, "The Big Picture," CNET News.com Review—700XL, Jun. 24, 2002, 2 pages.
http://msnbc-cnet.com.com/2100-1023-834044.html?tag=bp_1 st, "FTC prepares to bust spammers," Feb. 11, 2002, 2 pages.
http://msnbc-cnet.com.com/2100-1023-938103.html?type=pt&part=msnbc&tag=alert&form=f, "Anti-spam service battles bugs," Jun. 20, 2002, 3 pages.
http://www.cloudmark.com/, home products support company, "cloudmark," Jun. 24, 2002, 17 pages.

* cited by examiner

200C
PERSONAL PREFERENCE TABLE FOR THE FIRST E-MAIL RECIPIENT

| E-MAIL SOURCE | E-MAIL SOURCE TREATMENT PREFERENCE | E-MAIL CONTENT |
|---|---|---|
| JOE@YAHOO.COM | BLOCK WITH A SPECIAL MESSAGE TO THE SENDER | FOOTPRINT ASSOCIATED WITH HAWAII VACATION |
| JANE@HOTMAIL.COM | DELETE | CONTENT SIMILAR TO THE CONTENT OF JOE'S E-MAIL OF JUNE 6, 2007 |

FIG. 2C

200D
A MASTER TABLE ASSOCIATED WITH PLURALITY OF USER GROUPS

| USER GROUPS | GROUP MEMBERS | TREATMENT PREFERENCE | TOTAL NUMBER OF VOTES ASSOCIATED WITH EACH E-MAIL SOURCE |
|---|---|---|---|
| FIRST USER GROUP | FIRST E-MAIL RECIPIENT | (1) BLOCK E-MAILS FROM JOE@YAHOO.COM AND SEND A SPECIAL MESSAGE TO THE SENDER RE SAME (2) BLOCK E-MAILS HAVING FOOTPRINT ASSOCIATED WITH HAWAII VACATION | (1) 2 NEGATIVE VOTES ASSOCIATED WITH JOE@YAHOO.COM (2) 1 NEGATIVE INDICATION ASSOCIATED WITH E-MAILS HAVING FOOTPRINT ASSOCIATED WITH HAWAII VACATION (3) 1 NEGATIVE INDICATION ASSOCIATED WITH E-MAILS HAVING CONTENT SIMILAR TO CONTENT OF E-MAILS FROM E-MAIL SOURCE JOE@YAHOO.COM |
| | SECOND E-MAIL RECIPIENT | (1) BLOCK E-MAILS FROM JOE@YAHOO.COM (2) BLOCK E-MAILS HAVING SIMILAR CONTENT AS THE E-MAILS FROM JOE@YAHOO.COM | |
| SECOND USER GROUP | FIRST E-MAIL RECIPIENT | DELETE E-MAILS FROM JOE@YAHOO.COM | 2 NEGATIVE VOTES ASSOCIATED WITH JOE@YAHOO.COM |
| | THIRD E-MAIL RECIPIENT | DELETE E-MAILS FROM JOE@YAHOO.COM | |

```
┌─────────────────────────────────────────────────┐
│                   PREFERENCE                    │
│                                                 │
│   ☐   ASSIGN THE INDICATION TO ALL OF           │
│       MY USER GROUPS                            │
│                                                 │
│   ☐   ASSIGN THE INDICATION TO ONE OR           │
│       MORE OF MY USER GROUPS                    │
│                                                 │
│   ☐   DEFAULT SETTING                           │
│                                                 │
└─────────────────────────────────────────────────┘
```

FIG. 3B

| Inbox | | |
|---|---|---|
| 615 | FROM 605 | SUBJECT 610 |
| E-MAIL ALERT MESSAGE BASED ON FEEDBACK FROM USERS WITHIN USER'S USER GROUP  [VIEW COMMENTS ABOUT THE CONTENT] 615A  [VIEW COMMENTS ABOUT THE SENDER] 615B  √√√ | JOE SMITH | RE: 06975-811001 |
| [VIEW COMMENTS ABOUT THE CONTENT]  [VIEW COMMENTS ABOUT THE SENDER]  xxxxxx √√ | JOHN VENIE | RE: VIAGRA |
| [VIEW COMMENTS ABOUT THE CONTENT]  [VIEW COMMENTS ABOUT THE SENDER]  xx | JOHN SUE | RE: TRIP TO DREAMLAND |

| BLOCKED MAIL | | |
|---|---|---|
| 715 | 705 FROM: | 710 SUBJECT: |
| E-MAIL ALERT BASED ON FEEDBACK FROM USERS WITHIN ONE OR MORE USER GROUPS | | |
| VIEW COMMENTS ABOUT THE CONTENT WITHIN A FIRST USER GROUP / VIEW COMMENTS ABOUT THE SENDER WITHIN A FIRST USER GROUP | XXXXXXXXXXX E-MAIL FROM VICTOR@YAHOO.COM HAS RECEIVED 100 NEGATIVE INDICATIONS AND THEREFORE WAS BLOCKED. WOULD YOU LIKE TO UNBLOCK FUTURE E-MAILS FROM VICTOR@YAHOO.COM? [YES] [NO] | VICTOR@YAHOO.COM  RE: ADULT CONTENT |
| VIEW COMMENTS ABOUT THE CONTENT WITHIN A SECOND USER GROUP / VIEW COMMENTS ABOUT THE SENDER WITHIN A SECOND USER GROUP | | |
| VIEW COMMENTS ABOUT THE CONTENT WITHIN A FIRST USER GROUP / VIEW COMMENTS ABOUT THE SENDER WITHIN A FIRST USER GROUP | XXXXXXXX ✓ THE CONTENT OF THE E-MAIL FROM KIM@HOTMAIL.COM IS SIMILAR TO CONTENT THAT HAS RECEIVED 200 NEGATIVE INDICATIONS AND THEREFORE THIS E-MAIL WAS BLOCKED. WOULD YOU LIKE TO UNBLOCK FUTURE E-MAILS FROM KIM@HOTMAIL.COM OR TO UNBLOCK FUTURE E-MAILS HAVING SIMILAR CONTENT? [YES] [NO] | KIM@HOTMAIL.COM  RE: VIAGRA |
| VIEW COMMENTS ABOUT THE CONTENT WITHIN A SECOND USER GROUP / VIEW COMMENTS ABOUT THE SENDER WITHIN A SECOND USER GROUP | | |

FIG. 7

FILTERING INCOMING MAILS

CROSS REFERENCE TO RELATED APPLICATIONS

The present application claims priority from U.S. Provisional Application Ser. No. 60/938,393, filed May 16, 2007 and entitled "Filtering Incoming Mail," and claims priority from U.S. Provisional Application Ser. No. 60/946,633, filed Jun. 27, 2007 and entitled "Filtering Electronic Mails Based on Their Content and/or Source." The entire content of the prior applications is incorporated herein by reference.

TECHNICAL FIELD

This disclosure is related to filtering incoming mails.

BACKGROUND

An e-mail recipient may delete e-mails from undesirable e-mail sources, such as telemarketers, on a national or on an individual level. Similarly, the e-mail recipient may indicate that future e-mails from the particular e-mail source are to be deleted or forward to a particular folder (e.g., a junk folder). As such, future e-mails from the particular e-mail source are not presented within the inbox of e-mail recipient and are either deleted or forward to junk folder according to the e-mail recipient instructions.

DESCRIPTION OF DRAWINGS

FIG. 2C illustrates an exemplary personal preference table associated with an e-mail recipient.

FIG. 2D illustrates an exemplary master table associated with a plurality of user groups.

FIG. 3B illustrates an exemplary user interface that may be presented to a user, allowing the user to identify one or more user groups.

FIG. 6 illustrates an exemplary e-mail notification interface including first and second presentation styles.

FIG. 7 illustrates an exemplary e-mail notification interface for received e-mails that were specially treated.

DETAILED DESCRIPTION

Figure 1A:
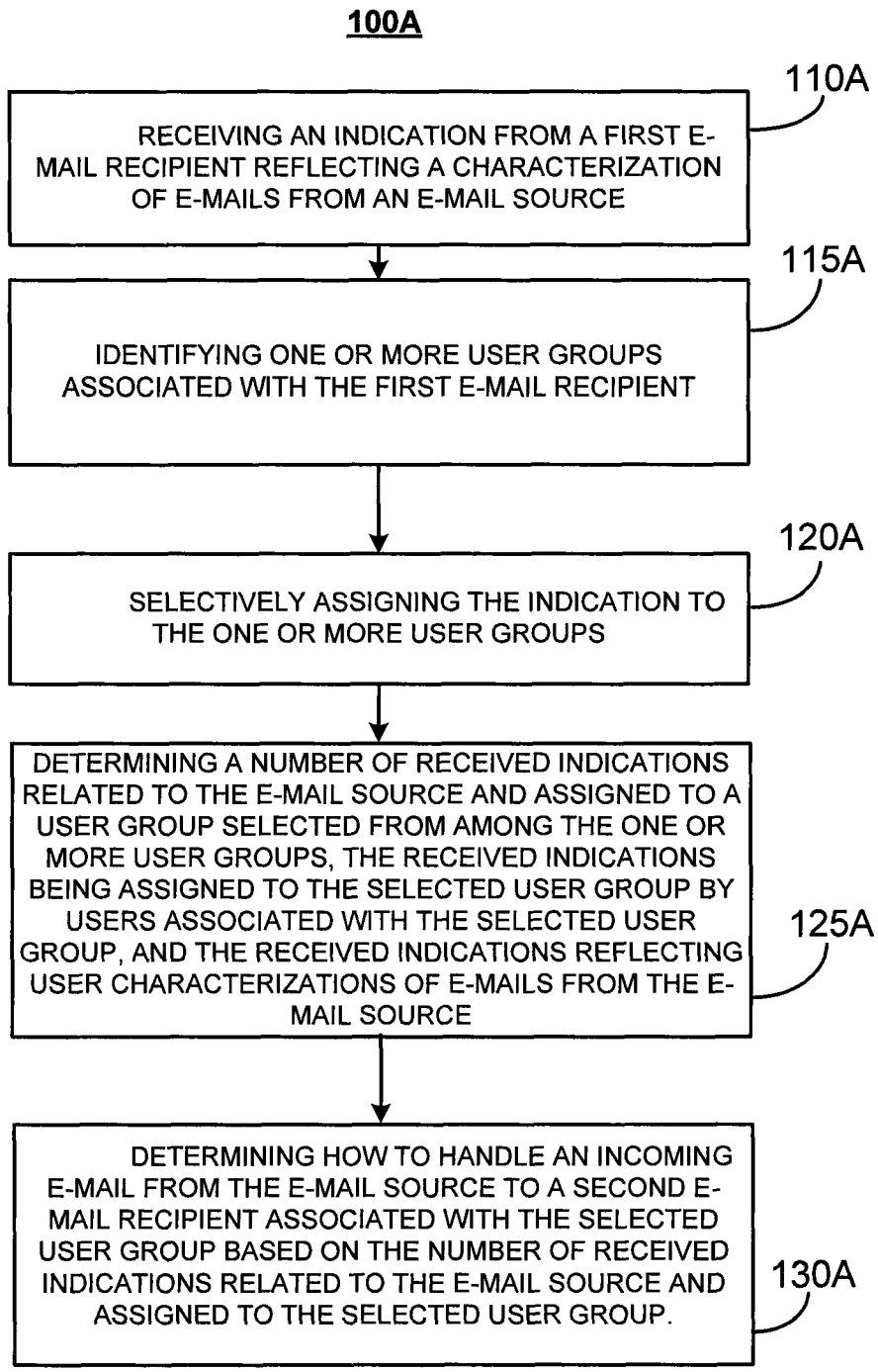
FIG. 1A illustrates an exemplary process used for specially treating e-mails from an e-mail source to an e-mail recipient based on the number of indications received from members of a user group of the e-mail recipient and corresponding to the e-mail source.

The techniques described herein relate to a system for filtering (1) incoming mails (e.g., voice mail, fax mail, short message service (SMS) messages, other text messages, instant messages (IM), and/or e-mail) and (2) mails already stored in a user's mail box. The system designates a mail as SPAM based on, for example, the user's selection and handles specially incoming mails having similar content as the designated SPAM mail and/or received from the same mail source. In addition, the system goes through the user's mail box (e.g., a voice mail box, a fax mail box, a text message mail box, an instant message mail box, and/or an e-mail mail box) and handles specially the mails stored therein that have content similar to that of the designated SPAM mail and/or received from the same mail source from which the designated SPAM mail originated. Special handling may include deleting mails identified as SPAM. Alternatively or additionally, special handling may include grouping mails identified as SPAM and displaying them differently to the user.

In one implementation, the system performs pattern and/or content recognition on the incoming mails to identify SPAM mails. In another implementation, the user flags a particular mail as SPAM. The system then stores the fingerprint associated with the content of the e-mail as well as the identity of the sender. The system uses the fingerprint and/or the identity of the sender to handle specially future mails having similar fingerprints and/or sender identity. In this manner, even if the spammer changes its identity, the spammer's mails would be treated specially (e.g., blocked) based on their content.

After the system identifies the e-mail as SPAM, the system may go through the user's inbox and clean it by, for example, treating specially mails that have similar fingerprints and/or that are associated with the same sender. This allows the user to maintain a clean electronic mailbox. In one implementation, treating specially includes deleting the mails that have similar fingerprints as the recognized SPAM mails and/or that are associated with the same sender. Alternatively or additionally, treating specially may include placing in a particular folder mails that have similar fingerprints as the recognized SPAM mails and/or that are associated with the same sender.

Alternatively or additionally, treating specially may include using a special presentation style to present the mails to the user that have similar fingerprints as the recognized SPAM mail and/or that are associated with the same sender.

Along these lines, the system may also access the user's profile to identify the user's social groups and provide the members of the identified social groups with similar kind of treatment. To illustrate one non-limiting example, if the user has a drinking club social group and a sport club social group, the system identifies the members of these social groups and for each member treats specially an incoming mail that has a similar content as the recognized SPAM mail and/or is from the same sender previously associated with SPAM mail. In one implementation, the user may selectively identify a particular social group or a subset of the user's social groups to which this process should be applied. For example, the user may instruct the system to apply this process only to the drinking club social group. Alternatively, the user may instruct the system to apply this process only to the sport club social group. The system also may apply this processing to either or both of the social groups in response to and/or subsequent to a threshold number of the users within either or both of the social groups indicating a desire that mails having similar content and/or from the same mail source as the SPAM mail receive similar treatment.

Figure 1B:
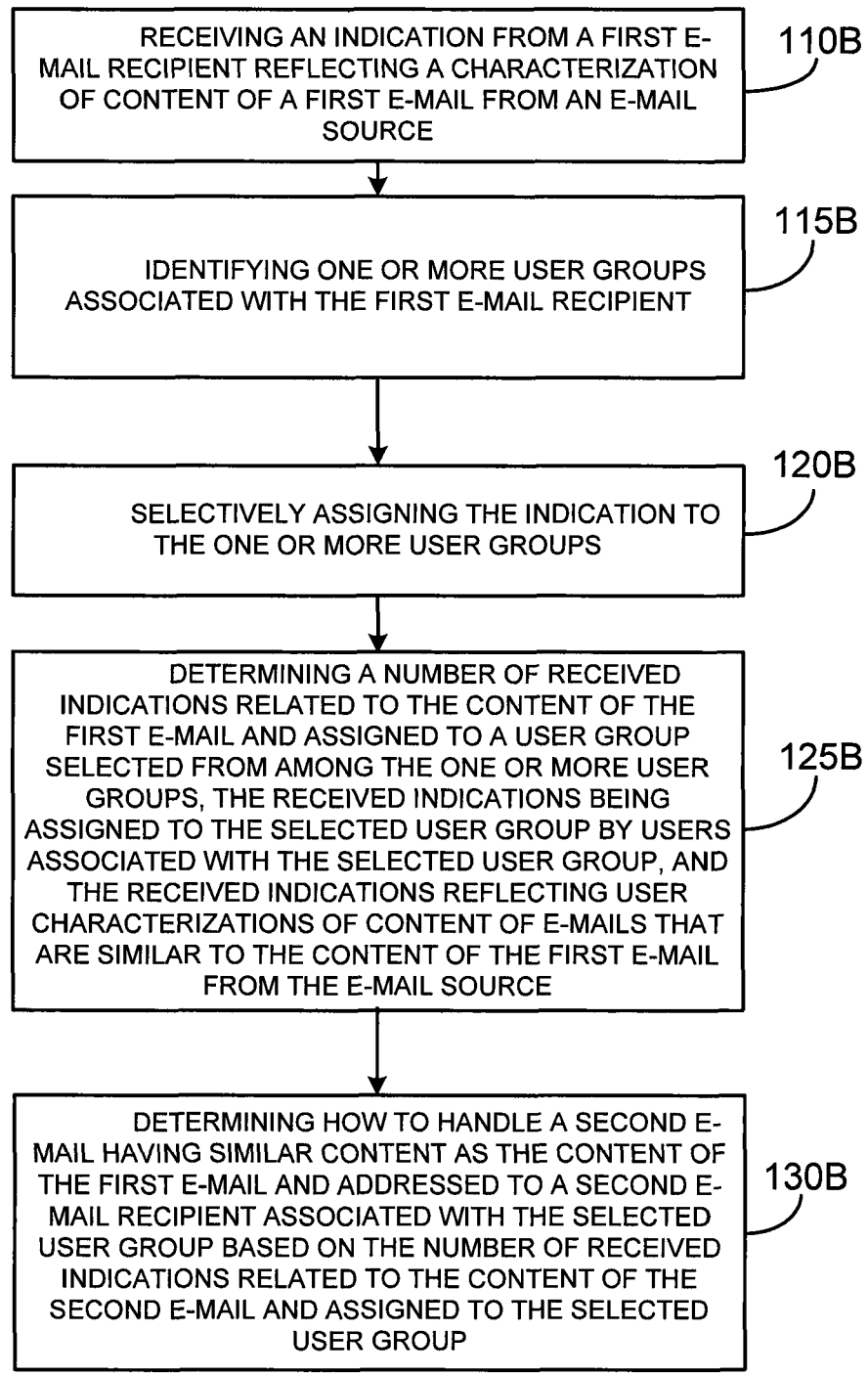
FIG. 1B illustrates an exemplary process used for specially treating an e-mail having a particular content based on the number of received indications corresponding to the particular content from members of a user group of the e-mail recipient.

FIGS. 1A and 1B illustrate two different exemplary processes used for specially treating an incoming e-mail to an e-mail recipient based on a number of received indications, from members of a user group of the e-mail recipient, corresponding to either a source of the incoming e-mail or content of the incoming e-mail. The processes of FIGS. 1A and 1B are generally similar. For ease of description, the implementation of FIG. 1A is discussed in detail, and a description of redundant aspects of the implementation of FIG. 1B is omitted for brevity.

FIG. 1A illustrates an exemplary process 100A used for specially treating e-mails from an e-mail source to an e-mail recipient based on the number of indications received from members of a user group of the e-mail recipient and corresponding to the e-mail source. The process 100A includes an e-mail handling system, such as the e-mail handling system 220 illustrated by FIG. 2A, receiving an indication from a first e-mail recipient reflecting a characterization of e-mails from an e-mail source (110A). In one example, the characterization of the e-mails from the e-mail sources includes an indication by the user of his/her desire to apply special treatment (e.g., blocking) to future e-mails from the e-mail source.

The special treatment may include special handling of the present and future e-mails from the e-mail source. The special handling may include blocking future e-mails from the e-mail source. Alternatively or additionally, the special handling may include storing the present and future e-mails from the e-mail source in a particular folder (e.g., junk folder). Alternatively or additionally, the special handling includes sending a message, such as an e-mail, to the e-mail source to instruct the source not to e-mail the first e-mail recipient again. In either case, the e-mail handling system carries out the special handling instructions.

The special treatment also may include special presentation of the future e-mails from the e-mail source. In keeping with the previous example, where the first e-mail recipient requests blocking future e-mails from the e-mail source, the e-mail handling system blocks the future e-mails from the e-mail source and notifies the first e-mail recipient of the same via a notification message.

After receiving a characterization from the first e-mail recipient, the e-mail handling system updates the preferences of the first e-mail recipient and specially treats the e-mail from the e-mail source. The e-mail handling system updates the preferences of the first e-mail recipient stored in the data storage for future reference such that all future e-mail from the e-mail source will be treated specially as indicated by the first e-mail recipient. For instance, the next time the e-mail source attempts to e-mail the first e-mail recipient, the e-mail handling system accesses the preferences of the first e-mail recipient, realizes that the e-mail should be treated specially, and accordingly treats the e-mail.

Figure 3A:
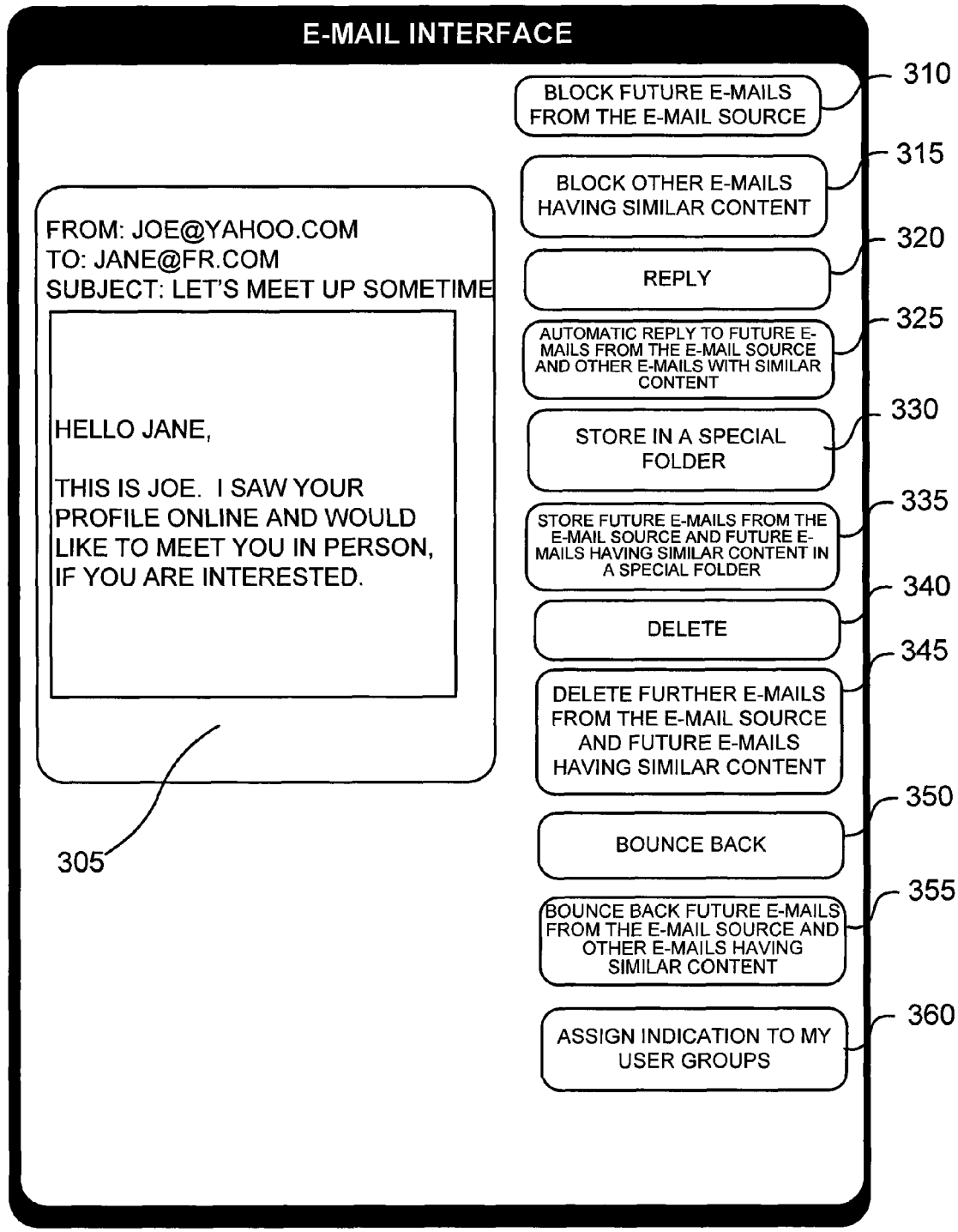
FIG. 3A illustrates an e-mail notification interface that may be presented to a user associated with an e-mail to which an e-mail announced by the e-mail notification interface was sent.

The e-mail handling system also identifies one or more user groups associated with the first e-mail recipient (115A). In one example, the one or more user groups are identified via the UI, such as the UI 300B illustrated by FIG. 3B. For instance, in addition to requesting special treatment for himself or herself, the first e-mail recipient operating a first destination computer system identifies to the e-mail handling system one or more user groups to which this indication should be applied. In a slightly different scenario, the one or more user groups may be identified based on the default setting associated with the first e-mail recipient. In either case, the e-mail handling system assigns the indication to the one or more identified user groups (120A) and increments the number of indications associated with the e-mail source for each of the one or more identified user groups for which the indication has been assigned.

Thereafter, if the source of e-mail sends an e-mail to one of the members of the user group, the e-mail handling system determines a number of received indications related to the e-mail source and assigned to a user group by users (e.g., the first e-mail recipient) associated with the user group and the received indications reflecting user characterization (e.g., blocking) of e-mails from the e-mail source (125A). The e-mail handling system determines how to handle an incoming e-mail from the e-mail source to a second e-mail recipient associated with the selected user group based on the number of received indications related to the e-mail source and assigned to the selected user group. For example, if the number of indications exceeds a threshold in one of the one or more identified user groups, the e-mail handling system specially treats the e-mail for the second e-mail recipient.

FIG. 1B illustrates an exemplary process 100B used for specially treating an e-mail having a particular content based on the number of received indications corresponding to the particular content from members of a user group of the e-mail recipient. Process 100B is generally similar to the process 100A. A difference between process 100B and process 100A is that in process 100B the incoming e-mail is characterized based on its content rather than its source. For example, the user is allowed to treat specially (e.g., block) an incoming e-mail based on its content regardless of where the incoming e-mail originates from. To this end, the e-mail handling system stores the content associated with the e-mail, identifies the sender of the e-mail, and treats specially the messages having similar content and/or arriving from the same sender. Accordingly, even if the spammer changes its identity, its message would be effectively blocked based on its content.

Process 100B also includes identifying one or more user groups associated with the first e-mail recipient (115B) and selectively assigning the indication to the one or more user groups (120B). The actions (115B and 120B) are similar to actions (115A and 120A), and therefore, they are not described here in more detail. Process 100B also includes determining a number of received indications related to the content of the first e-mail and assigned to a user group selected from among the one or more user groups, the received indications being assigned to the selected user group by users (e.g., the first e-mail recipient) associated with the selected user group, and the received indication reflecting user characterization of content of e-mails that are similar to the content of the first e-mail from the e-mail source (125B).

Process 100B also includes determining how to handle a second e-mail having similar content as the content of the first e-mail and addressed to a second e-mail recipient associated with the selected user group based on the number of received indications related to the content of the second e-mail and assigned to the selected user group. To do so, in one implementation, the e-mail handling system identifies the fingerprint associated and compares the identified fingerprint with the fingerprint associated with the first e-mail. Upon determination that the fingerprint of the second e-mail matches the fingerprint of the first e-mail, the e-mail handling system treats specially the second e-mail in accordance to the special treatment associated with the first e-mail.

In keeping with a previous example, the e-mail handling system determines the number of received indications related to the content of the first e-mail and assigned to a hunting club of the first e-mail recipient. The received indications being assigned by users associated with the hunting club social group and reflecting a desire for special treatment for content of e-mails that are similar to the content of the first e-mail from the e-mail source.

Thereafter, when one of the users within the hunting club social group, receives a second e-mail, either from the same source or a different source, that has content similar to the content of the first e-mail the e-mail handling system treats specially the second e-mail based on the number of received indications related to the content of the first e-mail.

Figure 2A:
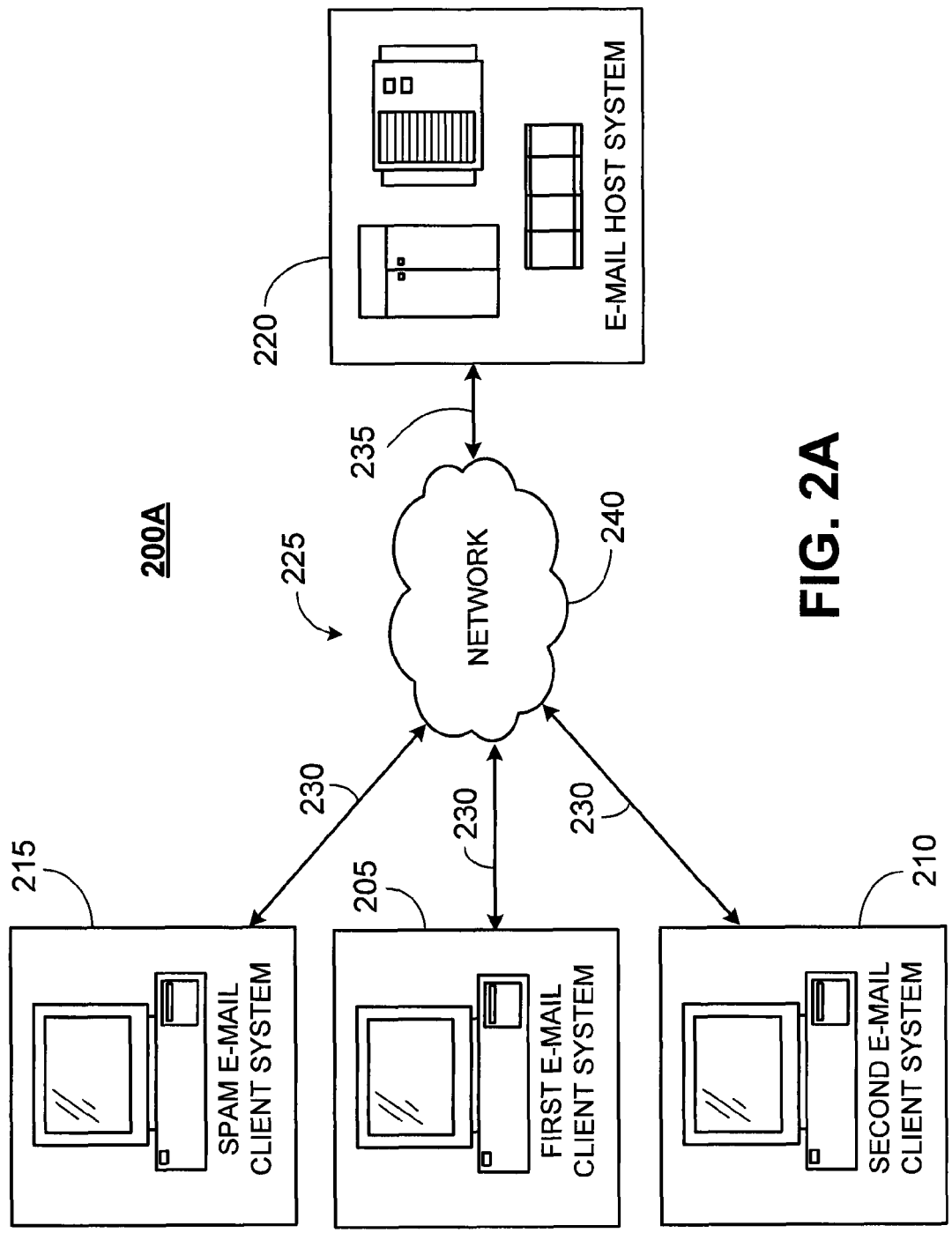
FIG. 2A illustrates an e-mail-oriented implementation that a first e-mail recipient may use to characterize one or more e-mails based on either their contents or sources according to processes illustrated by FIGS. 1A and 1B.

FIG. 2A illustrates an e-mail-oriented implementation 200A that a first e-mail recipient may use to characterize one or more e-mails based on either their contents or sources according to process 100A and 100B, respectively. The e-mail communications system 200A includes a first e-mail client system 205, a second e-mail client system 210, and a spam e-mail client system 215 communicating with an e-mail host system 220 through a communications link 225. The communications link 225 includes communications pathways 230 and 235 that make able communications through the one or more delivery networks 240.

The first e-mail client system 205 and the second e-mail client system 210 each include an e-mail application used to log into, send e-mails to, and receive e-mails from the e-mail host system 220. The spam e-mail client system 215 includes an e-mail application and is configured to send spam e-mails to the first and second e-mail client systems 205, 210. The spam e-mail client system 215 and the first and second e-mail client systems 205, 210 may be a desktop computer and/or a laptop computer. In another implementation, the spam e-mail client system 215 and the first and second e-mail client systems 205, 210 may be a mobile personal digital assistant (PDA) with embedded cellular phone technology.

The network 240 is configured to enable direct or indirect e-mail communications between the spam e-mail client system 215, the first and second e-mail client systems 205, 210, and the e-mail host system 220. When a user of the spam e-mail client system 215 sends an e-mail to the first e-mail client system 205 or the second e-mail client system 210, the network 240 is configured to forward the e-mail to the e-mail host system 220.

The e-mail host system 220 provides e-mail services to a recognized user of the first e-mail client system 205 and a recognized user of the second e-mail client system 210. These services include providing recognized users with the ability to compose and organize e-mails and the ability to send e-mails to and receive e-mails from other users across the one or more delivery networks 225. The services also include applying special treatment to certain incoming e-mails based on instructions received from one or more users.

In particular and in one implementation, the e-mail host system 220 is configured to receive, from a first e-mail recipient operating the first e-mail client system 205, instructions on how to treat present and future e-mails from the spam e-mail client system 215. For example, the first e-mail recipient may conclude, based on reviewing the first e-mail from the spam e-mail client system 215, that e-mails from the spam e-mail client system 215 are generally spasm and therefore instructs the e-mail host system 220 to block the e-mails from the e-mail client computer system 215. Thereafter, the e-mail host system 220 blocks future e-mails from the spam e-mail client system 215 that are directed to the first e-mail recipient operating the first e-mail client system 205.

Furthermore, the e-mail host system 220 is configured to receive, from the first e-mail recipient, instructions on how to treat present and future e-mails having similar content as the e-mail from the spam e-mail client system 215. For example, the first e-mail recipient may conclude, based on reviewing the first e-mail from the spam e-mail client system 215, that (1) future e-mails from the spam e-mail client computer system 215 are generally spam and therefore should be blocked and (2) other e-mails from other sources having similar content as the first e-mail should also be blocked. Accordingly, the first e-mail recipient instructs the e-mail host system 220 about the same and the e-mail host system 220 blocks (1) future e-mails from the spam e-mail client system 215 and (2) other e-mails having similar content as that of the first e-mail from the spam e-mail client system 215. Alternatively or additionally, the first e-mail recipient may instruct the e-mail host system 220 to block other e-mails having similar content to any of the received e-mails from the spam e-mail client system 215.

Regardless of whether the first e-mail recipient instructs the e-mail host system 220 to only treat specially (e.g., block) e-mails from the spam e-mail client system 215 or to treat specially e-mails from the spam e-mail client system 215 and also e-mails having similar content as the e-mails from the spam e-mail client system 215, the first e-mail recipient may also instruct the e-mail host system 220 to apply this special treatment to one or more user groups of the first e-mail recipient. To this end, the e-mail host system 220 is configured to determine how to treat the incoming e-mail from the same source or having the similar content as the first e-mail to a second e-mail recipient operating the second e-mail client system 210 based on the number of received indications (e.g., votes) assigned to a selected user group of the second e-mail recipient. The indications may be assigned by the users who are within the selected user group, and the indications may reflect a desire by the users for the special treatment of e-mails from the e-mail source and/or e-mails having similar content as the first e-mail from the e-mail source. In one example, the users include the first e-mail recipient operating the first e-mail client system 205.

Figure 2B:
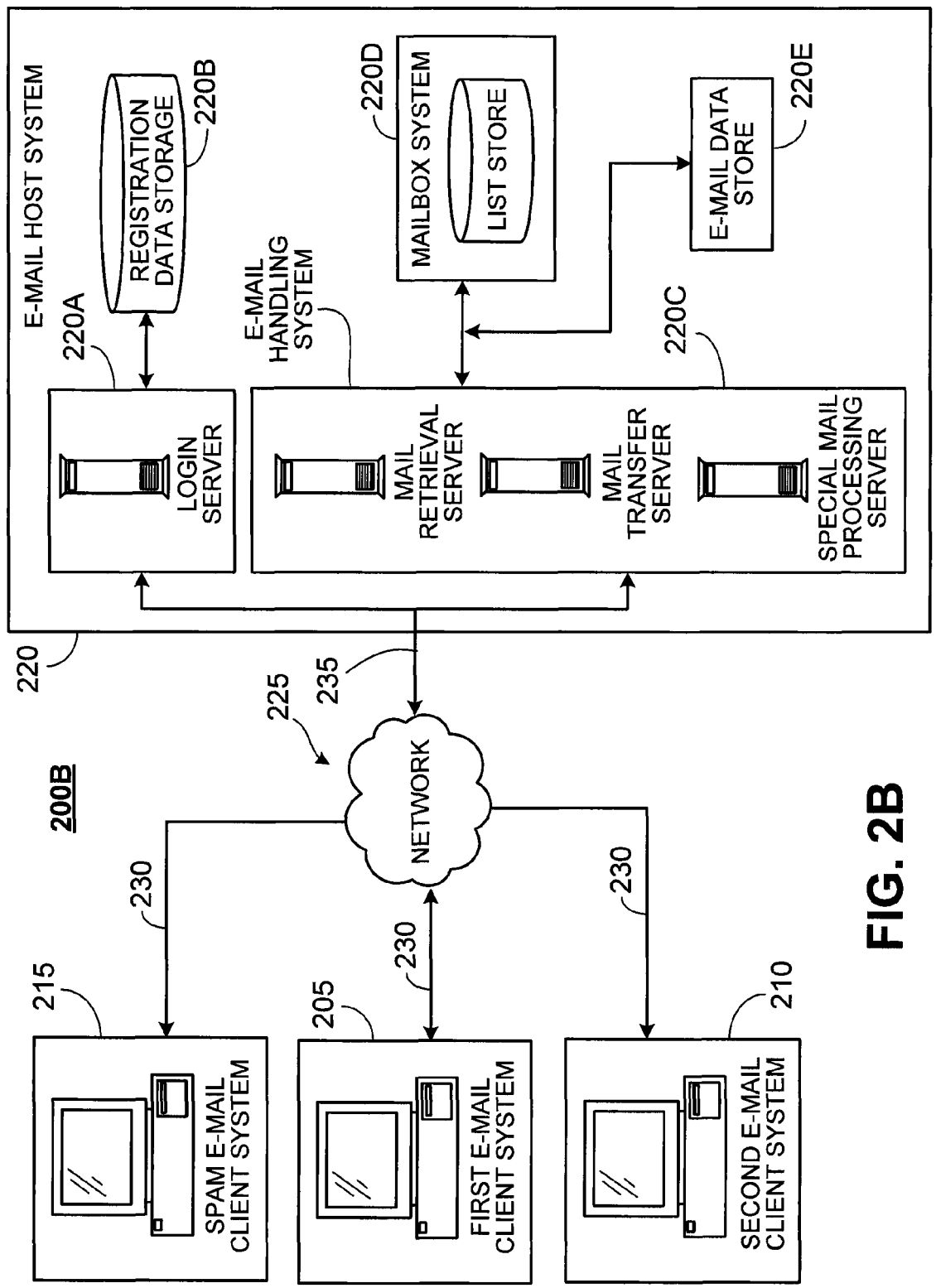
FIG. 2B illustrates one implementation of the e-mail communications system illustrated by FIG. 2A and configured for specially treating e-mails from e-mail sources.

FIG. 2B illustrates one implementation 200B of the e-mail communications system 200A illustrated by FIG. 2A and configured for specially treating e-mails from e-mail sources. E-mail communications systems may be implemented in a wide variety of ways, and the details and specificity of this implementation is for illustrative purposes only and not meant to be limiting. The same functionality may be achieved in a variety of different ways. The exemplary implementation of an e-mail communications system 200B configured to specially treat e-mails from e-mail sources includes the first e-mail client system 205, the second e-mail client system 210, and the spam e-mail client system 215 communicating with the e-mail host system 220 through the communications link 225. The first e-mail client system 205, the second e-mail client system 210, the spam e-mail client system 215, and the communications link 225 were described in detail previously with respect to FIG. 2A, and, as such, they are not described here in more detail.

The implementation 200B illustrates in more detail components of the e-mail host system 220. As shown, the e-mail host system 220 includes a login server 220A that accesses a registration data store 220B, an e-mail handling system 220C, a mailbox system 220D, and a mail data store 220E. The login server 220A verifies the identity of a user prior to allowing the user access to the e-mail services offered by the e-mail host system 220. The login server 220A accesses the registration data store 220B to determine whether a given user attempting to access e-mail services has, in fact, been registered for such services. The login server 220B prevents users that have not been registered for e-mail services from accessing the e-mail services provided by the e-mail host system 220.

The e-mail host system 220 includes a mail retrieval server, a mail transfer server, and a special mail processing server. The mail retrieval server is configured to retrieve e-mails stored in the mail data store 220E. The mail retrieval server communicates with the first and second e-mail client systems 205, 210 using a protocol for retrieving e-mails such as, for example, Internet Message Access Protocol (IMAP) or Post Office Protocol (POP). The mail retrieval server may receive from the mailbox system 220D a list of the e-mails stored in the mail data store 220E that are available for retrieval. The mail retrieval server may be, for example, a POP or IMAP server.

The mailbox system 220D keeps track of information about the e-mails stored in the electronic mailbox of each registered user (i.e., storage area in which the e-mails of each user are stored). The mailbox system stores this information in the list store 220F. The list store 220F is a data store that may include a data entry for each e-mail in the mailbox of each user. The data entry for each e-mail may include the header information of the e-mail, the e-mail status information (e.g., message read or not read), and e-mail data storage pointer information. The e-mail data storage pointer information may include one or more pointers to the locations in the mail data store 220E in which the e-mail body, the embedded object data, and the attachments of the given e-mail are stored. The list store 220F may also store other information related to the mailbox of each user, such as, for example, the size and remaining capacity of the mailbox.

The mail transfer server provides the first and second e-mail client systems 205, 210 with the ability to receive e-mails from and send e-mails to other users. The mail transfer server communicates with the first and second e-mail client system 205, 210 using a protocol for transferring e-mails such as, for example, Simple Mail Transfer Protocol (SMTP).

The mail transfer server receives e-mails sent by the first and the second client systems 205, 210. If the recipient of an e-mail sent by the first or second client system 205 is registered for e-mail services with the e-mail host system 220 (i.e., the e-mail is addressed to a mailbox in the e-mail host system 220), the mail transfer server may store the e-mail in the mailbox of the recipient. If the recipient of an e-mail is not registered for e-mail services with the e-mail host system 220 but is receiving e-mail services from a second and different e-mail host system in communication with the e-mail host system 220 through the one or more delivery networks 240, the mail transfer server may send the e-mail to the mail transfer server of the different e-mail host system associated with the recipient.

The mail transfer server also receives e-mails from mail transfer servers of the second e-mail host system addressed to a recipient receiving e-mail services from the e-mail host system 220. The mail transfer server may store the e-mails in the mailbox of the recipient. The mail transfer servers may be, for example, SMTP gateways.

When the mail transfer server receives an e-mail addressed to a recipient who is registered with the e-mail host system 220, the mail transfer server may communicate with the mailbox system 220D to determine whether the mailbox of the recipient is valid and whether the mailbox is full. If the mailbox of the recipient is valid and is not full, the mail transfer server stores the e-mail in the mail data store 220E and accordingly updates the data entries in the list store 220F to reflect the arrival of a new e-mail in the mailbox of the recipient. If the mailbox of the recipient is not valid or is full, the mail transfer server typically sends or bounces the e-mail back to the sender with an appropriate error message.

The mail data store 220E stores e-mail data including the body, embedded object data, and attachments of e-mails received by users registered to receive e-mail services provided by the e-mail host system 220. To this end, the mail data store 220E may include a body data store, an embedded object data store, and an attachments data store. The mail data store 220E sends e-mail data to the mail retrieval server and receives e-mail data for storage from the mail transfer server. The e-mail data, which typically is compressed when stored, is typically decompressed by the mail data store 220E or the mail retrieval server upon being retrieved. The mail data store 220E also may provide the mailbox system 220D and/or the mail transfer server with e-mail data storage pointer information.

A user of the first e-mail client system 205 typically is registered prior to accessing the e-mail services provided by the e-mail host system 220. The registration process includes generating a user configuration file for the user. The configuration file includes a unique identifier such as, for example, an e-mail address or a screen name. The configuration file also may include a password that must be provided by the user each time the user wants to access the e-mail services provided by the host system 220. The user configuration files may be stored in the list data store 220F.

When a user wants to access the e-mail services provided by the e-mail host system 220, the user launches or executes an e-mail application that communicates with the login server 220A. The user may log into the e-mail host system 220 by providing his or her unique identifier and his or her password. The login server 220A verifies that the unique identifier and associated password correspond to a unique identifier and associated password stored in the registration data store and registered to receive e-mail services.

The e-mail handling system 220C also includes the special mail processing server. The special mail processing server is configured to apply special treatment to certain incoming e-mails based on instructions received from one or more users operating either the first or second e-mail client system 205, 210. In particular, the special mail processing server is configured to receive, from a first e-mail recipient operating the first e-mail client system 205, instructions on how to treat present and future e-mails from the spam e-mail client system 215 for the first e-mail recipient operating the first e-mail client system 205 and for users (e.g., the second e-mail recipient operating the second e-mail client system 210) included in the user group of the first e-mail recipient.

Figure 4A:
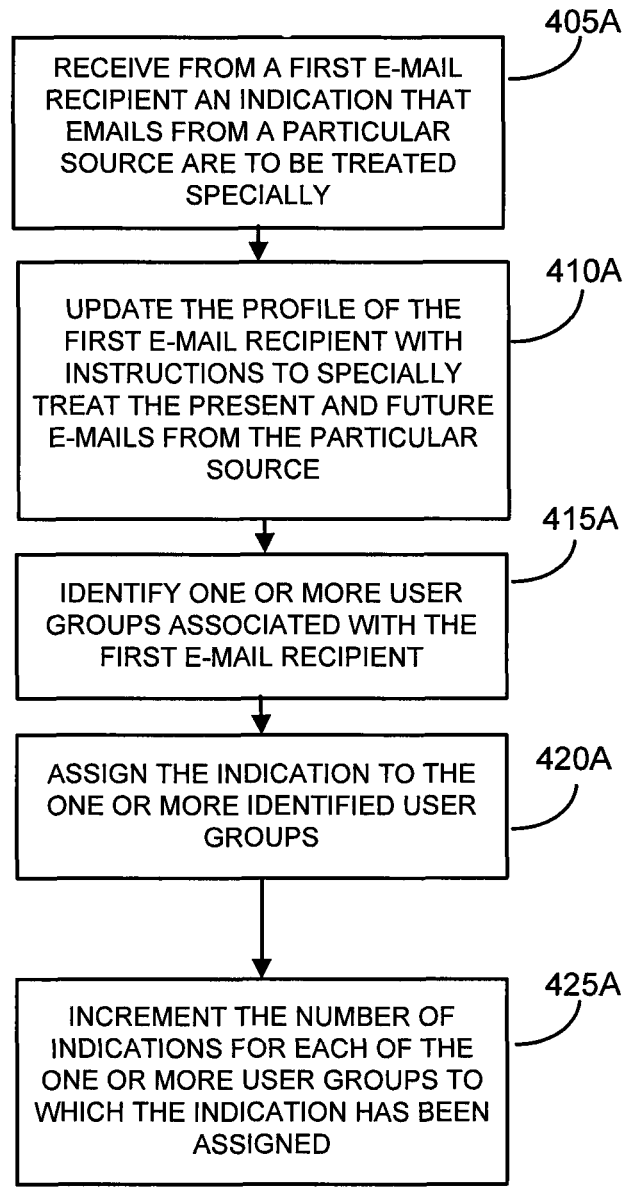
FIG. 4A illustrates an exemplary process that is used to identify an e-mail source to which a special treatment should be applied for at least one user (e.g., a first e-mail recipient) and a desire that similar treatment should be applied for other users (e.g., a second e-mail recipient) associated with the at least one user.
Figure 4B:
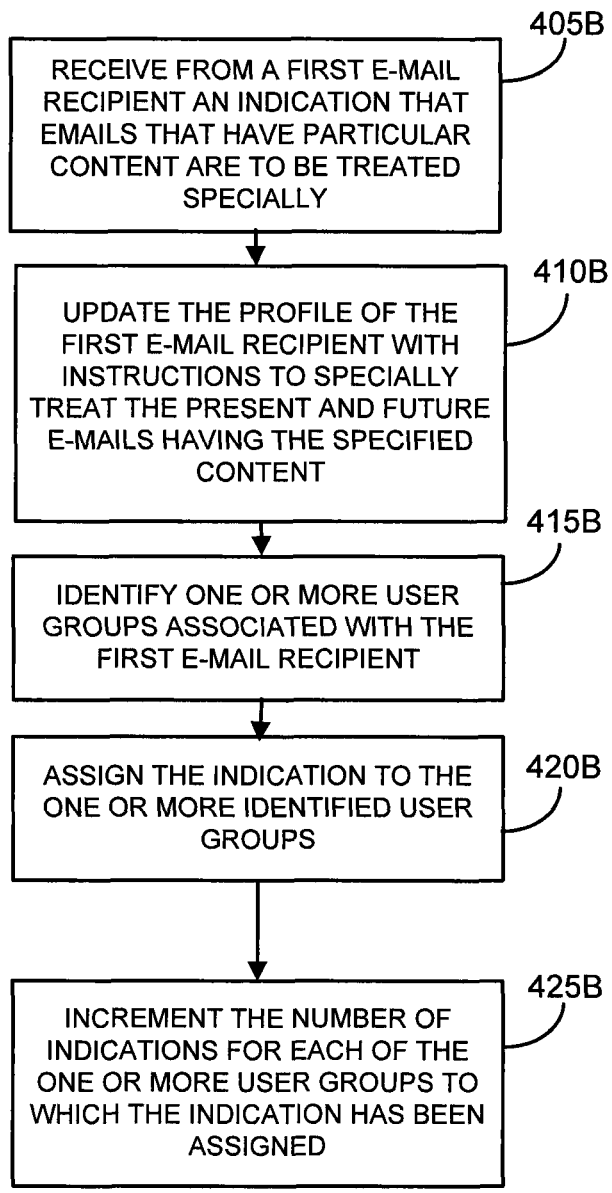
FIG. 4B illustrates an alternative exemplary process that is used to identify an e-mail content to which a special treatment should be applied for at least one user (e.g., a first e-mail recipient) and a desire that similar treatment should be applied for other users (e.g., a second e-mail recipient).
Figure 4C:
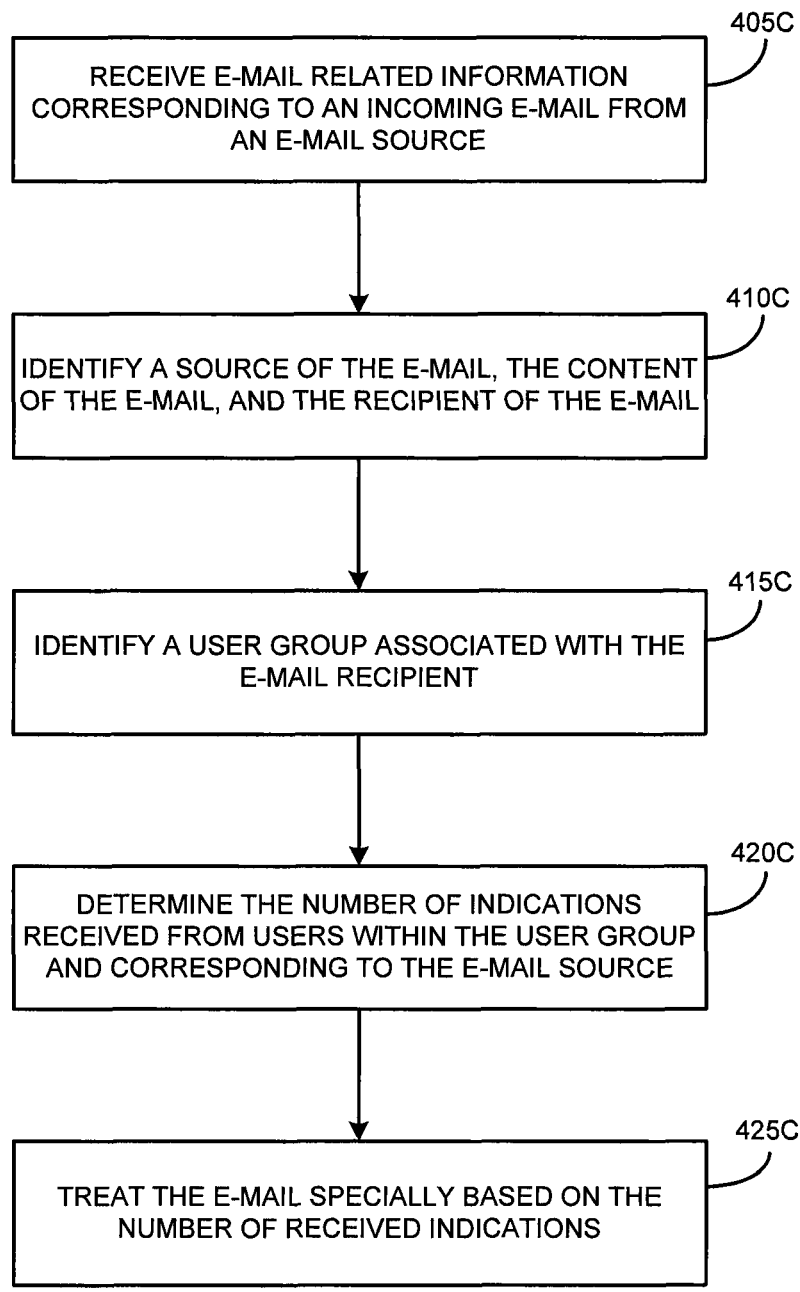
FIG. 4C illustrates an exemplary process used for specially treating e-mails from an e-mail source to an e-mail recipient based on the number of received indications corresponding to the e-mail source from members of a user group of the e-mail recipient.

Described below first is a process for receiving, at the special mail processing server and from the first e-mail recipient, instructions to specially treat the e-mails from the spam e-mail client system 215 for the first e-mail recipient and for users (e.g., the second e-mail recipient) included in a user group associated with the first e-mail recipient. FIG. 4A illustrates an example of such a process. Also described below is a process for receiving, at the special mail processing server and from the first e-mail recipient, instructions to specially treat an e-mail based on its contents for the first e-mail recipient and for users (e.g., the second e-mail recipient) included in a user group associated with the first e-mail recipient. FIG. 4B illustrates an example of such a process. Furthermore, described below is a process for specially treating an incoming e-mail from the spam e-mail client system 215 to the second e-mail recipient based on the number of indications assigned to a user group including the second e-mail recipient and received from other users (e.g., the first e-mail recipient) within the user group, the indications reflecting desire for special treatment of the incoming e-mail based on its source and/or its content. FIG. 4C illustrates an example of such a process.

First, the first e-mail recipient operating the first e-mail client system 205 receives an e-mail from the spam e-mail client system 215. The e-mail may be presented to the first e-mail recipient via a UI, such as, for example, the UI 300A illustrated by FIG. 3A. The first e-mail recipient may use the UI 300A to instruct the special mail processing server to specially treat the e-mail from the spam e-mail client system 215. The special treatment may include special presentation and/or handling of e-mails from the spam e-mail client system 215. The special presentation may include presenting the e-mails from the spam e-mail client system 215 with a particular presentation style. The particular presentation style may include flagging e-mails from the spam e-mail client system 215 with a particular color, font, or adding to the e-mail indicators associated with the e-mail source or the e-mail content.

The special treatment also may include specially handling the e-mails from the spam e-mail client system 215. The special handling may include blocking e-mails from the spam e-mail client system 215 or forwarding e-mails from the spam e-mail client system 215 to a particular folder (e.g., junk folder). Alternatively or additionally, the special handling includes sending a message, such as an e-mail, to the e-mail source to instruct the source not to e-mail the first e-mail recipient again.

Referring also to FIG. 4A, the special mail processing server receives, from the first e-mail recipient, the instructions that e-mails from the spam e-mail client system 215 are to be treated specially (405A). In response, the special mail processing server updates the profile of the first e-mail recipient, and specially treats present and future e-mail from the spam e-mail client system 215 to the first e-mail client system 205 according to the received instructions (415A). In one specific example, where the first e-mail recipient requests blocking e-mails from the spam e-mail client system 215, the special mail processing server blocks e-mails directed to the first e-mail recipient from the spam e-mail client system 215, and the special mail processing server presents on the first e-mail client system 205 an indication of such action. This informs the first e-mail recipient that the spam e-mail client system 215 e-mailed the first e-mail recipient and the e-mail was subsequently blocked.

In addition to using the UI 300A to instruct the special mail processing server to specially treat e-mails from the spam e-mail client system 215 to the first e-mail client system 205, the first e-mail recipient also may use the UI 300A to instruct the special mail processing server to specially treat the e-mails for other users (e.g., the second e-mail recipient). The other users (e.g., the second e-mail recipient) may be associated with the first e-mail recipient by virtue of being within a user group that is associated with or includes the first e-mail recipient. To this end, the first e-mail recipient uses the UI 300A to selectively assign an indication reflecting a desire for such a treatment to one or more user groups associated with the first e-mail recipient. In response, the special mail processing server identifies the one or more user groups associated with the first e-mail recipient (420A) and assigns the indication to the one or more identified users groups (425A).

A user group may be a group of users that share a common interest, trait, or characteristic. User groups include, for example, users in a contact list, a social club (e.g., hunters enthusiast club) and a corporate organization. A user group may be a social group having members that socially interact with each other. A user group also may be a demographic group having users that share, for example, the same age, income, and/or geographic location.

By incrementing the number of indications for each of the one or more user groups to which the indication has been assigned, the special mail processing server keeps track of the total number of indications associated with the spam e-mail client system 215 and received within each of the one or more user groups (430A). If the total number of indications within any of the user groups exceeds a threshold, the special mail processing server specially treats e-mails from the spam e-mail client system 215 to the users (e.g., the second e-mail recipient) within the user group. Therefore and as more fully described below, e-mails from the spam e-mail client system 215 are specially treated for a user (e.g., the second e-mail recipient) who may not have actively indicated that e-mails from the spam e-mail client system 215 should be specially treated. As such, the user may take advantage of the experience of other users within the user group of the user who have previously received e-mails from the spam e-mail client system 215.

In a slightly different implementation and as illustrated by FIG. 4B, instead of or in addition to instructing the special mail processing server to treat special mails based on their source (e.g., the spam e-mail client system 215) the first e-mail recipient operating the first e-mail client system 205 instructs the special mail processing server to treat specially e-mails based on their content. To illustrate and in keeping with the previous example, after receiving an e-mail from the spam e-mail client system 215, the first e-mail recipient instructs the special mail processing server via, for example, the UI 300A, that mails having content similar to the received e-mails from the spam e-mail client system 215 should be treated specially regardless of their source. In this manner, the special mail processing server notes the content of the e-mail from the spam e-mail client system 215 and specially treats e-mails having similar content as the received e-mail.

The first e-mail recipient also may instruct the special e-mail processing server to treat specially for other users (e.g., the second e-mail recipient) within the user group of the first e-mail recipient e-mails that have similar content as the e-mail received from the spam e-mail client system 215. To this end, when a second e-mail recipient receives an e-mail that includes content similar to the e-mail received from the spam e-mail client system 215, the special mail processing determines the number of received indications associated with the content and assigned to a user group that includes the second e-mail recipient by the users (e.g., the first e-mail recipient) within the user group and based on the number of received indications specially treats the e-mail.

To further illustrate and moving to the third process outlined above, after e-mailing the first e-mail recipient, the spam e-mail client system 215 may send an e-mail to the second e-mail recipient operating the second e-mail client system 210. In keeping with the above-described example, the first e-mail recipient is assumed to have previously instructed the special mail processing server to specially treat the e-mails for other users (e.g., the second e-mail recipient) associated with the user group of the first e-mail recipient.

Referring also to FIG. 4C, upon sending the e-mail to the second e-mail recipient the special mail processing server receives the e-mail and identifies the source of the e-mail (405B, 410B). The special mail processing server then accesses or otherwise identifies the user group of the second e-mail recipient (415B) and determines the number of received indications from users within the user group and corresponding to the e-mail source (420B). If the number of indications exceeds a threshold, the special mail processing server specially treats the e-mails from the spam e-mail client system 215 to the second e-mail client system 210 (425B).

The special mail processing server updates personal preferences of the users (e.g., the first and second e-mail recipients) within the e-mail data store 220E. FIG. 2C illustrates an exemplary personal preference table 200C associated with the first e-mail recipient. The personal preference table may include a list of e-mail sources from which e-mails should be treated specially. For instance and in keeping with the above-described example, the personal preferences of the first e-mail recipient include a preference to block e-mails from the spam e-mail client system 215. The personal preference also may include a preference to apply user groups to filter e-mails from an e-mail source. For instance, again in keeping with the above-described example, the personal preferences of the second e-mail recipient include a preference to apply user group filtering to e-mails directed to the second e-mail client system 210. As such, when the spam e-mail client system 215 sends an e-mail to the second e-mail recipient operating the second e-mail client system 210, the special mail processing server accesses the user group of the second e-mail recipient to determine the number of received indications (if any) relating to the spam e-mail client system 215 and assigned to the user group.

In one specific example and referring to FIG. 2D, the special mail processing server accesses a master table, such as, for example, master table 200D and uses this table to identify the number of indications (if any) related to the spam e-mail client system 215 and received within the user group of the second e-mail recipient. The master table 200D identifies one or more user groups and the users associated with each of the one or more user groups. The master table 200D also shows the preferences associated with each user within the user group.

For example, assuming the e-mail associated with the spam e-mail client system 215 is joe@yahoo.com, then in the situation illustrated by FIG. 2D, two received negative indications are associated with the spam e-mail client system 215 in the first user group to which the second e-mail recipient belongs. In this manner, the special mail processing server can easily identify the number of received indications assigned to the spam e-mail client system 215. And, if the number of received indications exceeds the threshold, the special mail processing server specially treats the e-mail for the second e-mail recipient.

Figure 5A:
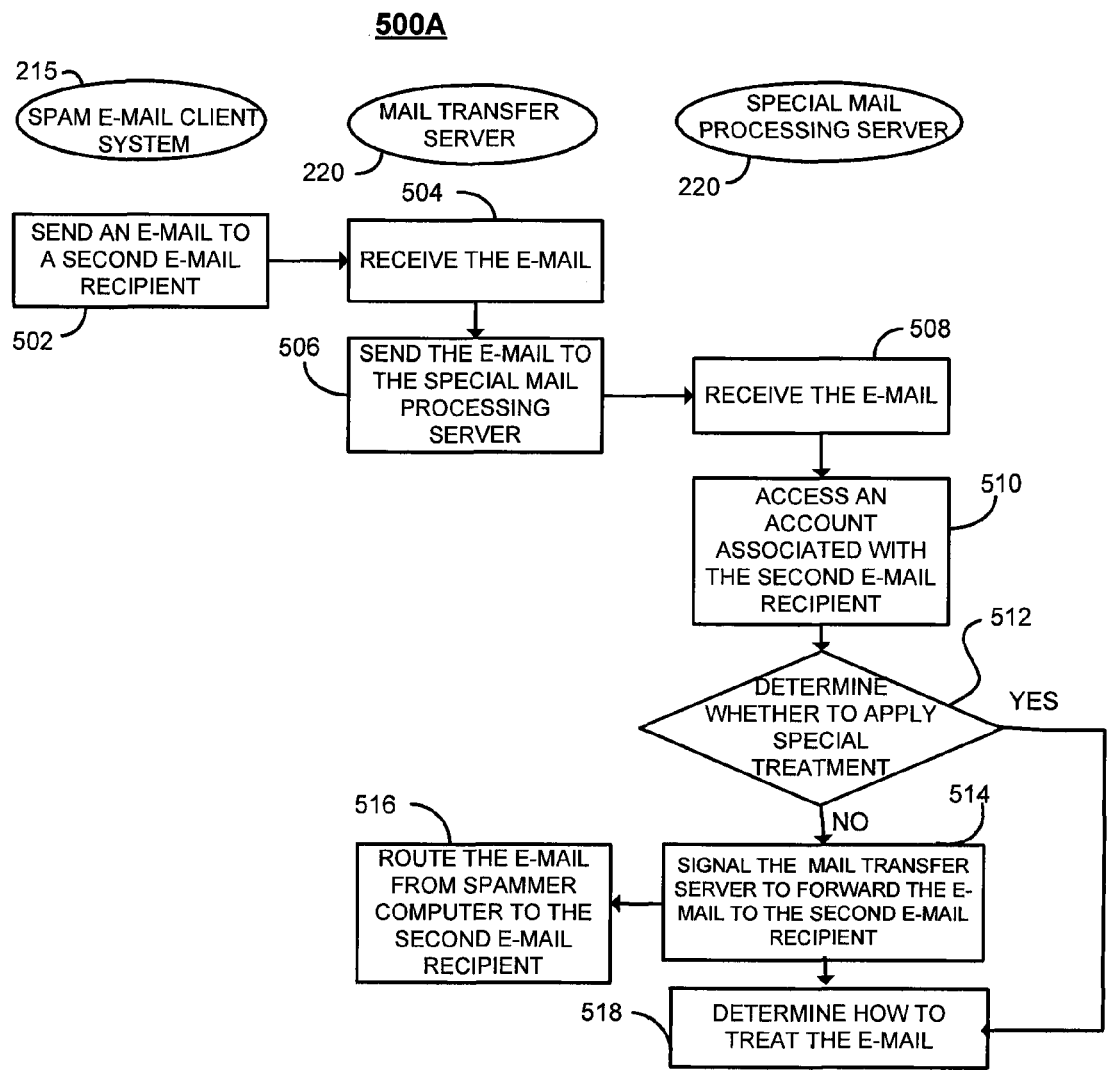
FIGS. 5A-5C illustrate a process used for treating an e-mail to an e-mail recipient for which e-mail from e-mail sources are treated specially.
Figure 5B:
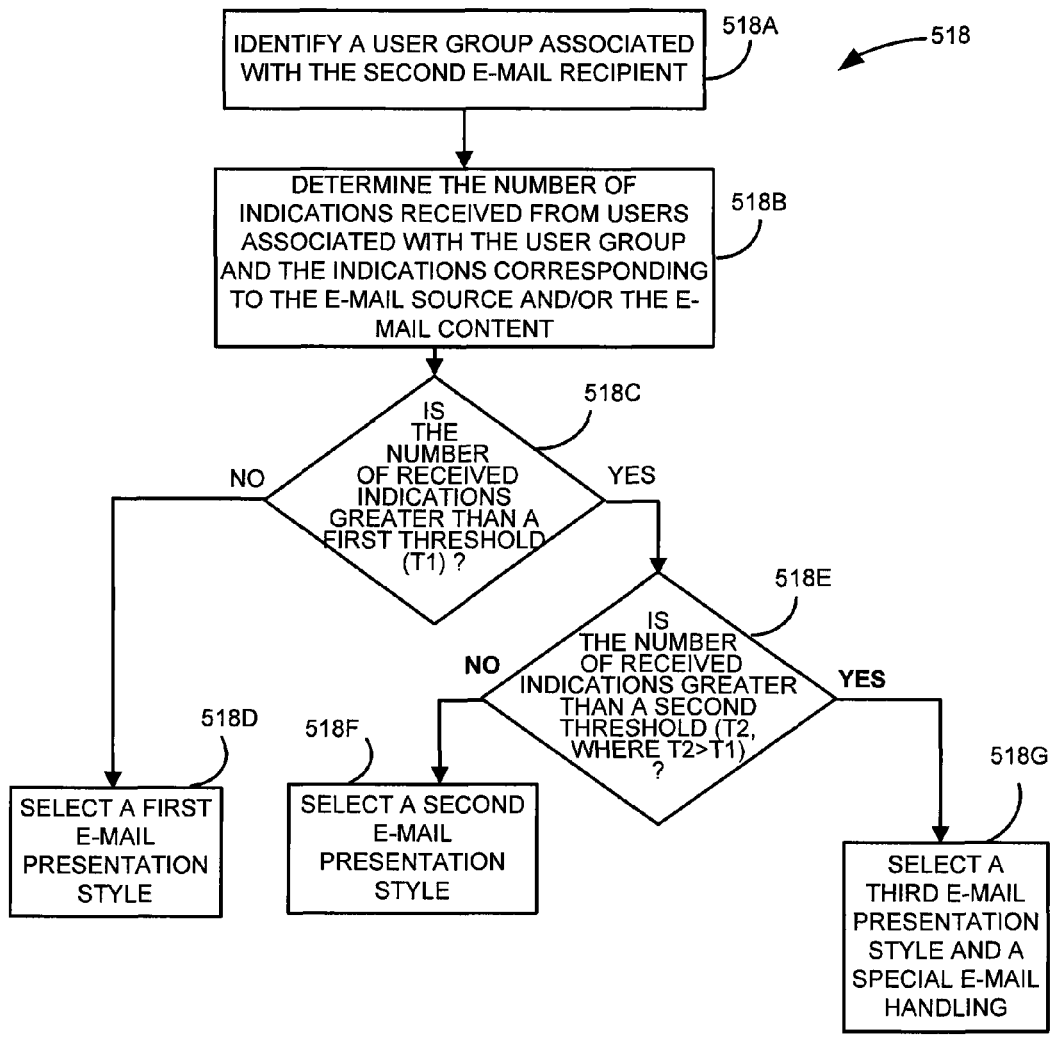
Figure 5C:
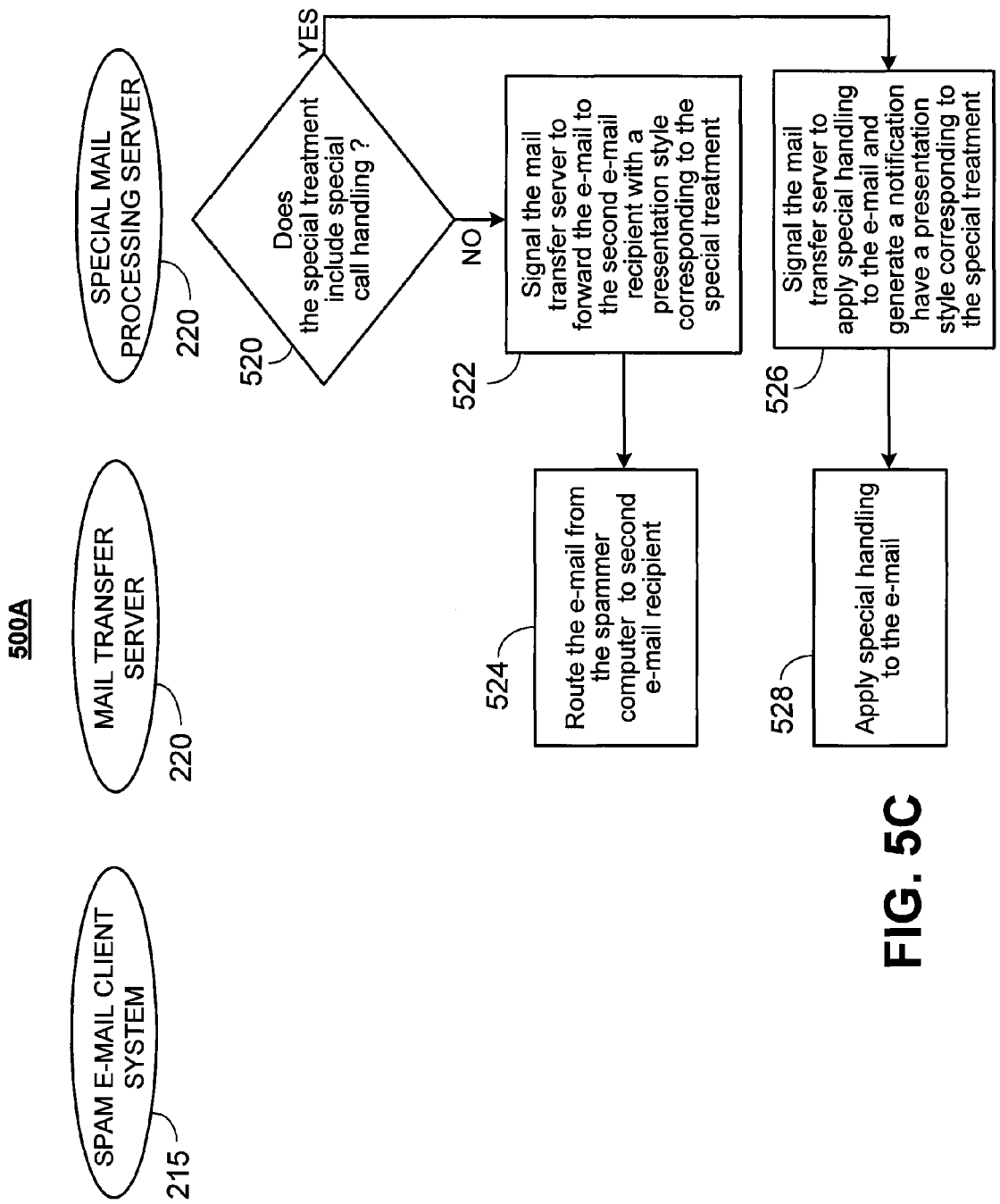

In particular and as described with respect to FIGS. 5A-5C, the special mail processing server interacts with the mail transfer server to effectuate handling of the e-mail from an e-mail source (e.g., the spam e-mail client system 215). To this end, the special mail processing server may direct the mail transfer server to accept the e-mail, block the e-mail, and/or forward the e-mail to a particular folder. In one example, the special mail processing server instructs the mail transfer server to send a message, such as an e-mail, to the e-mail source to instruct the source not to e-mail the first e-mail recipient again.

FIG. 2C illustrates an exemplary personal preference table 200C associated with the first e-mail recipient. As noted above, the preference table 200C includes a list of e-mail sources from which e-mails should be treated specially. The preference table 200C also includes a list of e-mail content that should be treated specially. The preference table 200C includes an e-mail source column 205C, an e-mail source treatment preference column 210C, and an e-mail content column 215C. The e-mail source column 205C includes the list of e-mail sources that should be treated specially, and the e-mail treatment preference column 210C includes a particular treatment that should be applied for each of the e-mail sources. For example, for e-mail source joe@yahoo.com, the treatment preference includes blocking the e-mails from joe@yahoo.com and sending a special message to joe@yahoo.com to inform joe@yahoo.com of the same. And, for e-mail source jane@hotmail.com, the treatment preference includes deleting e-mails from jane@hotmail.com.

The e-mail content column 215C includes the list of contents that should be treated specially, and the e-mail treatment preference column 210C includes a particular treatment that should be applied for each of the e-mail having the listed contents. For example, e-mail's having content associated with "Hawaii vacation" should be blocked and the sender of those e-mails should be notified of the same. For another example, e-mails having content similar to the content of the Joe's e-mail of Jun. 6, 2007 should be deleted. As such, in this manner, the user can manually specify particular contents that should be treated specially or alternatively can specify content based on already received e-mails (e.g., Joe's e-mail of Jun. 6, 2007). In either case, this feature allows the user to block particular content regardless of the sender of the e-mail. Accordingly, even if the spammer changes his or her identity (e.g., e-mail address), the spammer's e-mail will be effectively blocked based on its content.

FIG. 2D illustrates an exemplary master table 200D associated with a plurality of user groups. As noted above, the master table 200D is used to identify the number of received indications associated with a particular e-mail source (e.g., the spam e-mail client system 215) or particular e-mail content. The master table 200D includes a user group column 205D, a user column 210D, a treatment preferences column 215D, and total received indications column 220D. The user group column 205D includes the list of user groups (e.g., the first user group and the second user group). The user column 210D includes the list of users within each of the user groups identified in the user group column 205D. For example, as shown, the user column 210D identifies the first and second e-mail recipients within the first user group, and the second and third e-mail recipients within the second user group.

The master table 200D also includes the treatment preferences column 215D. The treatment preferences column 215D includes treatment preferences associated with users within each user group. For example, within the first user group, the treatment preferences associated with the first e-mail recipient includes: (1) a preference to block e-mails from e-mail source joe@yahoo.com; and (2) a preference to block e-mail having a fingerprint associated with vacation in Hawaii. The master table 200D also includes the total received indications column 220D. The total received indications column 220D identifies, within each user group, the total number of received indications associated with the e-mail source or associated with particular e-mail content. For example, within the first user group, the total number of received indications associated with the e-mail source joe@yahoo.com is two, whereas, the total number of received indications associated with the e-mails having fingerprint associated with vacation in Hawaii is only one. Similarly, the total number of received indications associated with the e-mails having similar content as e-mails from joe@yahoo.com is also one.

In a slightly modified scenario, instead of or in addition to merely identifying the total number of received indications within each user group, the total received indications column 220D may be modified to identify, within all the user groups, the total number of received indications associated with the particular e-mail source or with particular e-mail content. In this manner, the total received indications column 220D identifies that the total number of received indications associated with, for example, joe@yahoo.com is four. In like manner, the total received indications column 220D identifies that the total number received indications associated with e-mails having fingerprint associated with vacation in Hawaii is one.

In either case, when a user (e.g., the second e-mail recipient, keeping with the above-described example) requests to filter e-mails based on feedback from users within a user group, the special mail processing server within the e-mail host system 220 accesses the master table 220D to identify (1) the number of received indications associated with the e-mail source (e.g., spam e-mail client system 215) within the user group and/or the number of received indications associated with the content from the e-mail source (e.g., spam e-mail client system 215).

In one implementation, the master table 200D includes a separate entry, such as, for example, the total received indications column 220D that tracks the number of received indications associated with each e-mail source and each e-mail content within the user group. In another implementation, the special mail processing server references the master table 200D and calculates on the fly the total number of received indications associated with the e-mail source or e-mail content. In either case, if the number of received indications exceeds a threshold, the special mail processing server specially treats the e-mail from the e-mail source.

For example, assuming the e-mail source is joe@yahoo.com, the special mail processing server determines, within the user group of the second e-mail recipient (e.g., the first user group), the total number of received indications associated with the e-mail source is two. The special mail processing server then compares this number against a threshold (either set by the system or the user) and if the number exceeds the threshold, the special mail processing server specially treats the e-mail from the e-mail source. For instance, if the threshold is zero, then the special mail processing server will block the e-mail from the e-mail source and informs the second e-mail recipient that the e-mail from the e-mail source was blocked.

For another example, assuming the e-mail source is bza@yahoo.com, the special mail processing server determines, within the user group of the second e-mail recipient (e.g., the first user group), there is no indication associated with the e-mail. The special mail processing server then may extract the text of the e-mail and compare it against the listed content for which special treatment should be applied. In doing so, the special mail processing server compares the content of e-mail from bza@yahoo.com with content of previous e-mails from joe@yahoo.com and determines that it is at least similar to one of the content of previous e-mails from joe@yahoo.com. Thereafter, the special mail processing server determines, within the first user group, the total number of received indications associated with e-mails having similar content as e-mails from joe@yahoo.com is one. The special mail processing server then compares this number against a threshold (either set by the system or the user) and if the number exceeds the threshold, the special mail processing server specially treats the e-mail from the e-mail source.

In one implementation, the special mail processing server updates the master table 200D periodically to reflect recent changes among the preferences of the users within the user group. To do so, the special mail processing server accesses the personal preference table, such as, for example, table 200C associated with each user within the user groups, identifies new changes within the personal preferences table, and accordingly updates the master table 200D. In another implementation, the special mail processing server updates the master table 200D each time a user requests that a particular treatment to be applied to an e-mail source or to e-mail content. In response to the request, the special mail processing server applies the particular treatment to the e-mail source and/or e-mail content and updates both the personal preference table and the master table.

FIG. 300A illustrates an e-mail notification interface 300A that may be presented to a user associated with an e-mail to which an e-mail announced by the e-mail notification interface 300A was sent. In keeping with the previous example and for convenience, particular components described with respect to FIG. 2B are referenced in describing the e-mail notification interface 300A. The e-mail notification interface 300A includes e-mail identification information 305 and a variety of handling options 310-355, and an assign an indication to my user groups option 360.

The e-mail identification information 305 identifies an originating e-mail address, a destination e-mail address, a subject line, and a body that includes the content of the e-mail. In one specific example, the e-mail identification information includes a Microsoft Outlook interface.

The variety of handling options includes a block future e-mails from the e-mail source option 310, a block future e-mails from the e-mail source and other e-mails having similar content option 315, a reply option 320, automatic reply to future e-mails from the email source and other e-mails with similar content option 325, a store in a special folder option 330, store future e-mails from the e-mail source and other e-mails having similar content in a special folder option 335, a delete option 340, delete future e-mails from the e-mail source and other e-mails having similar content option 345, a bounce back option 350, and bounce back future e-mails from the e-mail source and other e-mails having similar content option 355. Each of these options is described below in turn.

The block future e-mails from the e-mail source option 310 is used to indicate that the user desires to block future e-mails from the e-mail source (e.g., joe@yahoo.com). As such, selecting the block future e-mails from the e-mail source option 310 generates an indication of such a desire that is sent to the special mail processing server within the e-mail host system 220 of FIG. 2B. The special mail processing server updates the personal profile of the user to effectively block the next e-mail that is sent from the e-mail source to the user.

In addition to generating the indication when selected, the block future e-mails from the e-mail source option 310 may cause a message indicating that the block option 310 has been selected to be sent to the e-mail source. The message may be an electronic message, such as an instant message or an e-mail message, may be sent to the e-mail source.

The block other e-mails having similar content option 315 is used to indicate that the user desires to block other e-mails, regardless of their source, that have similar content as the present e-mail. As such, selecting the block future e-mails from the e-mail source option 315 generates an indication of such a desire that is sent to the special mail processing server. The special mail processing server updates the personal profile of the user to reflect the same and stores therein the fingerprint associated with the e-mail. Thereafter, for an incoming e-mail, the special mail processing server compares the text and/or fingerprint of the e-mail with the previously stored fingerprint to determine presence or absence of match therebetween. In the case that match exists, the special mail processing server blocks the incoming e-mail.

The reply option 320 is used to indicate that the e-mail is to be answered. Selecting the reply option 320, therefore, may generate a user interface allowing the user to formulate a response. The response may be in substance or may include a special message informing the e-mail source that, for example, the user does desire to receive future e-mails from the e-mail source, for example, because the email source is a spammer or the e-mail content is deemed undesirable.

The automatic reply to future e-mails from the e-mail source and other e-mails with similar content option 325 is used to indicate that future e-mails from the e-mail source and other e-mails having similar content are to be answered. Like the response sent when the reply option 320 is selected, the automatic reply may be in substance or may include a message informing the e-mail source not to send additional e-mails to the user. In one implementation, selection of the automatic reply option 325 generates another user interface allowing to more granularly specify the conditions that should apply to the automatic reply. In one example, the user interface not only allows the user to specify the automatic reply but also allows the user to apply the reply to e-mails from the e-mail source, other e-mails having similar content as the present e-mail, other e-mails having similar content as previously received e-mails from the e-mail source, and/or a combination of thereof.

In either case, selecting either of these options generates an indication of such a desire that is sent to the special mail processing server. The special mail processing server updates the personal profile of the user to reflect the same. To illustrate one non limiting implementation, where the user selects that automatic reply to be send to future e-mails from the e-mail source and other e-mails having similar content, after receiving an e-mail from the e-mail source stores the fingerprint of the e-mail and directs the mail transfer server to send the automatic reply to the e-mail source to, for example, inform the e-mail source to discontinue sending additional e-mails to the user. Additionally, the special mail processing server stores a fingerprint associated with the content of the e-mail and compares this fingerprint and previously stored fingerprint from previous e-mails from the e-mail source with the fingerprint of incoming e-mails from other e-mail sources. Upon determining that the fingerprint of the incoming e-mail matches the fingerprint of at least one of the previous e-mails from the e-mail source, the special mail processing server directs the mail transfer server to send the automatic reply to that e-mail source.

The store in a special folder option 330 is used to indicate a desire to store the e-mail from the e-mail source in a special folder. Selecting the special folder option 330, therefore, allows the user to store the present e-mail from the e-mail source in a special folder.

The store future e-mails from the e-mail source and other e-mails having similar content in a special folder option 335 is used to indicate a desire to store future e-mails from the e-mail source and/or other e-mails having similar content as the received e-mail(s) from the e-mail source in a special folder. In one implementation, selection of this option generates another user interface allowing the user to more granularly specify the user desired conditions. In one example, the user interface not only allows the user to specify the folder in which the received e-mail(s) should be stored but also allows the user to apply this option to e-mails from the e-mail source, other e-mails having similar content as the present e-mail, other e-mails having similar content as previously received e-mails from the e-mail source, and/or a combination of thereof.

The delete option 340 is used to indicate a desire to delete the e-mail from the e-mail source. As such, selecting the delete option 340 allows the user to delete the present e-mail from the e-mail source.

The delete future e-mails from the e-mail source and other e-mails having similar content option 345 is used to indicate a desire to delete future e-mails from the e-mail source and/or to delete other e-mails having similar content as the received e-mail(s) from the e-mail source. Like the option 335, selection of this option may generate another user interface, allowing the user to more specifically define the desired treatments. For example, selection of the option 335 generates a user interface that allows the user to apply the treatment to e-mails from the e-mail source, e-mails from other sources having similar content as the previously received e-mails from the e-mail source, e-mails from other sources having similar content as the current e-mail from the e-mail source, and/or a combination thereof.

The bounce back option 350 is used to indicate a desire to bounce back the e-mail from the e-mail source. Selecting the bounce back option 350, therefore, bounces back the e-mail from the e-mail source, informing the e-mail source that the e-mail was not delivered to the user. The user may use this option to create a perception in the mind of the sender that e-mail address is not valid to discourage the sender from sending additional e-mails to the user.

The bounce back future e-mails from the e-mail source and e-mails from other sources having similar content option 355 is used to indicate a desire to bounce back the future e-mails from the e-mail source and e-mails from other sources having similar content as the received e-mail(s) from the e-mail source. Like option 320, selection of the option 355 may generate another user interface, allowing the user to more specifically define the desired treatments. For example, selection of the option 355 generates a user interface that allows the user to apply the treatment to e-mails from the e-mail source, e-mails from other sources having similar content as the previously received e-mails from the e-mail source, e-mails from other sources having similar content as the current e-mail from the e-mail source, and/or a combination thereof.

The e-mail notification interface 300A also includes the assign indication to my user groups option 360. The assign an indication to my user groups option 360 is used to assign the indication, reflecting the desire of the first e-mail recipient to specially treat the e-mail(s) from the e-mail source (e.g., the spam e-mail client system 215) and/or e-mails related to the e-mail(s) from the e-mail source for other users within the first e-mail recipient's one or more user groups. The indication may include one or more of the various options 310-355 which the first e-mail recipient has selected for himself or herself. Additionally or alternatively, the indication may include comments about the e-mail source and or the e-mail content. Toward this end, the indication may be a positive, negative, or a neutral one. The positive indication may indicate that the e-mail source is trustworthy and/or the e-mail content is deemed valuable, the negative indication may indicate that the e-mail source is untrustworthy and/or the e-mail content is not deemed valuable, and the neutral indication may indicate lack of an opinion about the e-mail content and/or the e-mail source.

In one implementation, the user explicitly selects the indication to be positive, negative, or neutral by, for example, checking an appropriate box in a user interface. For example, selection of each one of the options (310, 315, 320, 325, 330, 335, 340, 345, 350, and 355) results in generation of another UI that solicits the user to indicate whether the selection made with respect to the option indicates a positive, negative, or neutral reaction toward the source of the e-mail and/or the content of the e-mail.

In another implementation, whether the indication is positive, negative, or neutral is inferred from the selection of one or more options (310, 315, 320, 325, 330, 335, 340, 345, 350, and 355) within the UI 300A, in response to the receiving an e-mail from the e-mail source (e.g., the spam e-mail client system 215). For example, the indication is deemed to be negative if the first e-mail recipient selects block options 310 and 315. Similarly, the indication is deemed to be negative if the first e-mail recipient selects bounce back options 350 and 355. Similarly, the indication is deemed negative if the first e-mail recipient's comments about the e-mail and/or its source are generally categorized as being unenthusiastic. By contrast, the indication may be deemed to be positive if the first e-mail recipient selects the reply option 320. Similarly, the indication may be deemed to be positive if the first e-mail recipient's comments about the e-mail or its source are generally categorized as being enthusiastic. The indication may be deemed to be neutral if the user selects the delete option 340.

If the first e-mail recipient wishes to assign the indication to the first e-mail recipient's one or more user groups, in one implementation, the first e-mail recipient first selects the box associated with the option 360, and then selects the indication (e.g., one of the options appearing in the UI 300A, such as, for example, block options 310 and 315). Selection of option 360 may result in generation of another UI, such as the UI 300B illustrated by FIG. 3B that is presented to the first e-mail recipient, allowing the first e-mail recipient to identify one or more user groups. For instance, the UI 300B allows the first e-mail recipient to assign the indication to all or a subset of all user groups of the first e-mail recipient. If the first e-mail recipient selects a subset of all user groups option, another UI is generated that allows the first e-mail recipient to identity the subset. The UI 300B also includes a default setting option. The default setting option may be associated with the default setting of the first e-mail recipient or the e-mail host system 320. In either case, the selection of the default setting option assigns the indication to one or more user groups of the first e-mail recipient based on the default settings. The default settings may be user configurable, and, as such, the first e-mail recipient may be able to change them form time to time.

FIG. 4A illustrates an exemplary process 400A that is used to identify an e-mail source to which a special treatment should be applied for at least one user (e.g., the first e-mail recipient) and a desire that similar treatment should be applied for other users (e.g., the second e-mail recipient) associated with the at least one user. FIG. 4B illustrates an alternative exemplary process 400B that is used to identify an e-mail content to which a special treatment should be applied for at least one user (e.g., the first e-mail recipient) and a desire that similar treatment should be applied for other users (e.g., the second e-mail recipient). The processes 400A and 400B are generally similar. Accordingly, the process 400A is described in detail below and the redundant aspects of the process 400B is not described for brevity.

In keeping with the previous examples and for convenience, particular components described with respect to FIG. 2B are referenced as performing the process 400A. More particularly, process 400A is executed by the e-mail host system 220 in response to instructions to specially treat the e-mails from the spam e-mail client system 215, where the instructions is received from the first e-mail recipient operating the first e-mail client system 205.

Process 400A begins with the special mail processing server within the e-mail host system 220 receiving, from the first e-mail recipient, an indication that e-mails from a particular e-mail source are to be treated specially (e.g., blocked) (405A). The indication may be generated by and received from an interface, such as the UI 300A. The UI 300A is displayed on the first e-mail client system 205 in response to a received e-mail from the spam e-mail client system 215.

After receiving an indication from the first e-mail recipient, the special mail processing server updates the preferences of the first e-mail recipient and specially treats the e-mails from the e-mail source (410A). The special mail processing server updates the preferences of the first e-mail recipient stored in the e-mail data storage 220E for future reference such that future e-mails from the e-mail source will be treated specially as indicated by the first e-mail recipient. For instance, the next time the e-mail source (e.g., joe@yahoo.com operating the spam e-mail client system 215) attempts to e-mail the first e-mail recipient, the special mail processing server accesses the preferences of the first e-mail recipient, realizes that the e-mail should be treated specially, and accordingly treats the e-mail.

The special treatment may include special handling of the present and future e-mails from the e-mail source. As noted above, special handling may include blocking the e-mail. Alternatively, the special handling may include bouncing the e-mail thereby establishing a perception that the e-mail was not delivered to the first e-mail recipient. In yet another example, special handling includes sending a message, such as an instant message or an e-mail, to the e-mail source to inform the user of the e-mail source/identity not to e-mail the first e-mail recipient again. In either case, the special mail processing server communicates the special handling instructions to the mail transfer server and instructs the mail transfer server to carry out the instructions.

The special treatment also may include special presentation of the future e-mails from the e-mail source. The special presentation may include presenting the e-mail in a different color, font and/or format. Alternatively or additionally, the special presentation may include presenting the e-mail along with comments of other users within the user group of the first e-mail recipient. The comments may appear as positive, negative, and/or neutral. The positive comments may be indicated by stars or check marks, whereas the negative comments may be indicated by red flags or "X" marks. The more stars or check marks indicate the higher number of positive comments, whereas the less stars or check marks indicate the lower number of positive comments. Similarly, the more red flags or "X" marks indicate a higher number of negative comments, where as the less red flags or "X" marks indicate a lower number of negative comments. In one implementation, the user can click on the comments to view them.

The special mail processing server also identifies one or more user groups associated with the first e-mail recipient (415A). In one example, the one or more user groups are identified via the UI, such as the UI 300B illustrated by FIG. 3B. For instance, in addition to requesting special treatment for himself or herself, the first e-mail recipient operating the first e-mail client system 205 identifies to the special mail processing server one or more user groups to which this indication should be applied. In a slightly different scenario, the one or more user groups may be identified based on the default setting associated with the first e-mail recipient. In either case, the special mail processing server assigns the indication to the one or more identified user groups (420A) and increments the number of indications associated with the e-mail source for each of the one or more identified user groups for which the indication has been assigned (425A). If the number of indications exceeds a threshold in one of the one or more identified user groups, the special mail processing server specially treats the future e-mails from the e-mail source for users within the one of the identified one or more user groups. FIG. 4C illustrates an exemplary process 400C used for specially treating e-mails from an e-mail source to an e-mail recipient based on the number of received indications corresponding to the e-mail source from members of a user group of the e-mail recipient. The process 400C is described below in more detail.

In another implementation, instead of or in addition to specially treating e-mails based on their source, the special mail processing server may specially treat e-mails based on their content. FIG. 4B illustrates an alternative exemplary process 400B that is used to identify an e-mail content to which a special treatment should be applied for at least one user (e.g., the first e-mail recipient) and a desire that similar treatment should be applied for other users (e.g., the second e-mail recipient). As noted above, the process 400B is generally similar to the process 400A, and, as such, the redundant aspect of the process 400B is not described here in more detail.

Process 400B begins with the special mail processing server receiving from the first e-mail recipient an indication that the e-mails having particular content are to be treated specially (405B). In one example, the first e-mail recipient provides such instructions to the special mail processing server in response to receiving an e-mail from an e-mail source operating, for example, the spam e-mail client system 215. Upon receiving the e-mail from the e-mail source, the first e-mail recipient recognizes based on the content of the e-mail that the e-mail is a spam and therefore requests that future e-mails from the e-mail source to be treated specially (e.g., blocked). To this end, the exemplary process 400A may be used to carryout such instructions. Alternatively or additionally, the first e-mail recipient may instruct the special mail processing server to specially treat future e-mails having similar content as the received e-mail regardless of their source. In this manner, if the e-mail source changes its user identity to perhaps circumvent filtering rules, the e-mails will be blocked based on their content.

After receiving an indication from the first e-mail recipient, the special mail processing server updates the preferences of the first e-mail recipient and specially treats future e-mails having similar content (410A). The special mail processing server updates the preferences of the first e-mail recipient stored in the e-mail data storage 220E for future reference such that future e-mails from the e-mail source will be treated specially as indicated by the first e-mail recipient. To illustrate, assuming the first e-mail from the spam e-mail client system 215 related to vacation house in Hawaii, the special mail processing server stores the fingerprint associated with this e-mail. And, when a second e-mail arrives compares the content of the e-mail with the stored fingerprint. Upon determination that they match, the special mail processing server treats specially the e-mail for the e-mail recipient.

Similar to the process 400A, in the process 400B the special mail processing server identifies one or more user groups associated with the first e-mail recipient (415B), assigns the indication to the one or more user groups (420B), and increments the number of received indications for each of the one or more groups (425B). And, based on the number of received indications within each of the one or more user group, the special mail processing server may treat specially the e-mail(s) having similar content for other users within the one or more users groups. These actions are similar to actions 415A, 420A, and 425A described above with respect to FIG. 4A, and, as such, they are not described here in more detail.

Regardless of whether the first e-mail recipient decides to treat specially e-mails based on their source and/or their content, the first e-mail recipient may instruct the special mail processing server to apply this treatment for other users within the user group of the first e-mail recipient. FIG. 4C illustrates an exemplary process 400C used for specially treating e-mails from an e-mail source to an e-mail recipient based on the number of received indications corresponding to the e-mail source from members of a user group of the e-mail recipient.

Process 400C begins with the special mail processing server receiving email-related information corresponding to an incoming e-mail from an e-mail source (405C). The special mail processing server may receive the e-mail related information from the mail transfer server. The special mail processing server uses the e-mail-related information to identify the online identity of the e-mail sender (e.g., e-mail address of the sender), the content of the e-mail (e.g., its fingerprint), and/or the online identity of the e-mail recipient (e.g., e-mail address of the recipient) (410C). The e-mail source includes, for example, the e-mail address of the spammer operating the spam e-mail client system 215.

The special mail processing server identifies a user group associated with the e-mail recipient (415C). In one example, the special mail processing server accesses an account based on the user identity of the e-mail recipient to identify the user group of the e-mail recipient. After identifying the user group, the special mail processing server, determines the number of indications corresponding to the e-mail source and/or to the e-mail content and received from members of the user group (420C). The indications may reflect a desire for specially treating the e-mails from the e-mail source. Alternatively or additionally, the indications may reflect a desire for specially treating the e-mails having similar content.

In one example, the indications are negative, reflecting a desire to block or otherwise ignore the e-mail because of its source and/or content. Alternatively or additionally, the indications may be positive, reflecting a desire for accepting and replying to the e-mail because of its source and/or content. Alternatively or additionally, the indications may be neutral, reflecting no particular attitude toward the e-mail.

The special mail processing server treats the e-mail specially based on the number of received indications (425C). In particular, if the number of received indications exceeds a threshold, the special mail processing server specially treats the e-mail from the e-mail source. In one implementation, the special mail processing server only tracks the negative indications received within the one or more user groups. That is, if the number of received negative indications within one of the one or more user groups exceeds the threshold, the special mail processing server specially treats the e-mail for the e-mail recipient (e.g., the second e-mail recipient operating the second e-mail client system 210).

In the implementation where the negative indications are not necessarily all the same, the special mail processing server may specially treat the e-mail from the e-mail source according to the negative treatment having the highest support among all the indications. Alternatively, regardless of the type of negative treatment specified by the indication, the special mail processing server may treat each negative indication as a desire to block the e-mail and accordingly blocks the e-mail if the number of received indications passes a threshold.

In another implementation, the special mail processing server tracks both positive and negative indications corresponding to the e-mail source and received from the members of one or more user groups. In this implementation, the special treatment differs based on the number of positive and negative indications. For example, if the number of positive indications exceeds the number of negative indications by a threshold, then the special mail processing server ignores the negative indications and treats the e-mail according to the positive indications. For instance, if the number of positive indications exceeds 100 and the number of negative indications is less than 2, then the special mail processing server forwards the e-mail from the e-mail source to the e-mail recipient. Similarly, if the number of received indications is more than a certain threshold amount from the positive indication, the special mail processing server ignores the positive indications and specially treats the e-mail according to the negative indications.

As note above, in the implementation, where the negative indications are not necessarily all the same, the special mail processing server may specially treat the e-mail from the e-mail source according to the negative treatment (e.g., blocking the e-mail, bouncing the e-mail, storing the e-mail in a particular folder, etc.) having the highest support among all the indications. Alternatively, regardless of the type of negative treatment specified by the indication, the special mail processing server may treat each negative indication as a desire to block the e-mail and accordingly blocks the e-mail if the number of received indications passes a threshold.

In a different scenario, the special mail processing server accumulates within each user group multiple indications based on the selection by members of the each user group of each of the different options shown in the UI 300A. For example, a user group indicates that 200 people in the group chose to delete the e-mail from the e-mail source, 100 people in the group blocked the e-mail from e-mail source, 55 people in the group stored the e-mail from the e-mail source within a special folder, and 22 people in the group replied to the e-mail from the e-mail source, in response to the e-mail. The special mail processing server may then determine the special treatment for the e-mail recipient by any combinations of the number of indications and type of indications. For example, the special mail processing server adds the number of the negative indications, compares it to the number of positive indications, and based on the result of comparison treats the e-mail specially. In particular and in keeping with the above-described example, the special mail processing server determines that the total number of negative indications far exceeds the total number of positive indication and thus, the special mail processing server chooses to block the e-mail from the e-mail source.

In a slightly different scenario, the special mail processing server presents the multiple indications to the e-mail recipient. This allows the e-mail recipient to perceive the different response of the members of the user's group to the e-mail source and subscribe to one of those responses. In another example, the special mail processing server selects the special treatment according to the type of indication having the highest number among all types of indications. In keeping with the above-described example, since the indication to delete the e-mail(s) from the e-mail source has received the highest number among other indications (e.g., 200 people in the group chose to delete the e-mail from the e-mail source), the special mail processing server selects to delete the e-mail from the e-mail source. Below, the process 400C is described in more detail with respect to FIGS. 5A-5C.

FIGS. 5A-5C describe in more detail the processes 400A and 400B illustrated by FIGS. 4A and 4B, respectively. Referring to FIGS. 5A-5C, a process 500A is used for treating an e-mail to an e-mail recipient for which e-mail(s) are treated specially. In keeping with the previous examples and for convenience, particular components described with respect to FIG. 2B are referenced as performing the process 500A. More particularly, the process 500A involves the second e-mail client system 210, the spam e-mail client system 215, and the mail transfer server and the special mail processing server within the e-mail host system 220. However, similar methodologies may be applied in other implementations where different components are used to define the structure of the system, or where the functionality is distributed differently among the components shown by FIG. 2B. For example, similar methodologies may be applied in implementations where the e-mail host system 220 is integrated into the second e-mail client system 210.

Process 500A begins with a user (e.g., spammer) of the spam e-mail client system 215 sending an e-mail to the second e-mail recipient operating the second e-mail client system 210 (502). The mail transfer server receives the e-mail from the spam e-mail client system 215 (504) and sends the e-mail and/or information describing the e-mail to the special mail processing server (506), which receives the e-mail and/or the information describing the e-mail (508).

The special mail processing server identifies the e-mail recipient (e.g., the second e-mail recipient operating the second e-mail client system 210) to which the e-mail is addressed. And, the special mail processing server accesses an account associated with the second e-mail recipient (510). The account is identified, for example, by accessing an account record stored in a configuration or registration data stored (e.g., the e-mail data storage 220E) and indexed by e-mail address. The special mail processing server determines whether special treatment is to be applied to the e-mail (512). The determination may be based on the accessed account. More particularly, the accessed configuration information may include preferences (e.g., preferences of the user stored in the e-mail data storage 220E) that indicate whether special treatment should be applied to the e-mail. If special mail processing server determines that the second e-mail recipient desires to receive no special treatment for incoming e-mails (512, no), the special mail processing server signals the mail transfer server to forward the e-mail to the second e-mail recipient operating the second e-mail client system 210 (514). In response to the signal, the mail transfer server routes the e-mail to the second e-mail recipient operating the second e-mail client system 210 (516).

If the special mail processing server determines that the second e-mail recipient desires to receive special treatment for incoming e-mails, the special mail processing server determines how to treat the e-mail from the spam e-mail client system 215 for the second e-mail recipient (518). FIG. 5B shows an exemplary implementation of operation 518 used to determine how to treat the e-mail from the spam e-mail client system 215.

Referring to FIG. 5B, the special mail processing server first identifies a user group associated with the second e-mail recipient (518A). The special mail processing server may access the e-mail data storage 220E to identify the user group associated with the second e-mail recipient based on the personal preferences of the second e-mail recipient. In one example, the user group identifies one or more users that subscribe to the same activity as the second e-mail recipient. For example, the one or more users include coworkers of the second e-mail recipient, in which case the user group is called a work user group. In another example, the one or more users include family of the second e-mail recipient, in which case the user group is called a family user group. In yet another example, the one or more users include friends of the second e-mail recipient, in which case the user group is called a friends user group.

Upon identification of the user group, the special mail processing server determines the number of received indications from users associated with the user group and the indications corresponding to the e-mail source (e.g., an e-mail address of the sender) and/or the e-mail content (518B). And, based on the number of received indications, the special mail processing server may specially treat the e-mail in one or more ways. In this implementation, the number of received indications correspond to negative indications (e.g., blocking the e-mail, bouncing back the e-mail, or sending a message to the e-mail source, or any combination thereof), which are determined explicitly by the user or inferentially from user responses to a previous e-mail from the e-mail source or a previous e-mail having a similar content.

In another implementation, the number of received indications correspond to positive and negative indications, and/or other type of indications such as indications (e.g., an ignore indication, a block indication, an answer indication, etc.) corresponding to each of the user options selected by the various users in the group in response to an e-mail from the e-mail source or an e-mail having similar content as the received e-mail. The selection of special treatment (e.g., the selection of both presentation style and e-mail handling) may then be determined based on the number of indications of a particular type or a combination of the number of indications of multiple different types as described more fully above with respect to FIG. 4B.

To this end, the special mail processing server determines whether the number of received indications (e.g., negative indications) is greater than a first threshold (518C). If not (518C, no), then the special mail processing server selects a first e-mail presentation style for presenting the e-mail to the second e-mail recipient (518D). On the other hand, if the number of received indications exceeds the first threshold (518D, yes), the special mail processing server checks to determine whether the number of received indications also exceeds a second threshold (518E). If not (518E, no), the special mail processing server selects a second e-mail presentation style for presenting the e-mail to the second e-mail recipient (518F). However, if the number of received indication also exceeds the second threshold (518E, yes), the special mail processing server selects a third e-mail presentation style for presenting the e-mail to the second e-mail recipient and also signals the mail transfer server to handle the e-mail according to the selected handling (518G).

In this manner, the special mail processing server can present the e-mail with three distinct presentation styles based on the number of indications/votes the e-mail has received within the second e-mail recipient user group. That is, if the number of indications/votes is minimal (e.g., less than the first threshold), the special mail processing server present the e-mail with a first presentation style that conveys this information to the second e-mail recipient. The e-mail notification interface 600 illustrated by FIG. 6 and described in detail below includes an example of the first e-mail presentation style. On the other hand, if the number of indications/votes are more than minimal but less than critical (e.g., more than first threshold but less than the second threshold), the e-mail from the e-mail source will be presented with the second presentation style that conveys this information to the second e-mail recipient. The e-mail notification interface 600 illustrated by FIG. 6 and described in detail below includes an example of the second e-mail presentation style. Alternatively, if the number of votes have reached a critical condition (e.g., more than the second threshold), the e-mail from the e-mail source will be blocked and a notification message with a third presentation style is presented to the second e-mail recipient to inform the second e-mail recipient that the e-mail was blocked. The e-mail notification interface 700 illustrated by FIG. 7 and described in detail below includes an example of the third e-mail presentation style.

Accordingly, in the above implementation example shown in FIG. 5B, special treatment for the e-mail is selected from one of three different special treatment options: (1) a first presentation style and no special handling if the number of indications does not exceed a first threshold; (2) a second presentation style and no special handling if the number of indications exceeds the first threshold but does not exceed a second threshold; and (3) a third presentation style and special handling (e.g., blocking the e-mail) if the number of indications exceeds the second threshold.

In other implementations, the special treatment may be selected from a set of different special treatment options corresponding to different permutations of presentation styles, special handling, and thresholds. For example, the special treatment options includes more than or less than three presentation styles. The special treatment options may include multiple options having both a presentation style and special e-mail handling. The special treatment options also may be selected based on ranges separated by more than or less than two different thresholds.

As stated previously, the special treatment also may be selected based on the number and type of indications received. The number of indications of multiple different types may be used to select the appropriate special treatment option by applying predetermined rules. Example rules may include: (1) if the number of bounce back indications plus the number of block indications is greater than 300, select presentation style three and block the e-mail; and (2) if the number of answer indications is greater than 100, irrespective of the other indications, select presentation style one and forward the e-mail to the second e-mail recipient.

Referring to FIG. 5C, the special mail processing server determines whether selected treatment in the operation block (518) includes special handling of the e-mail (520). If the special mail processing server determines that the special treatment does not include special handling (520, no), then the special mail processing server signals the mail transfer server to forward the e-mail to the second e-mail recipient operating the second e-mail client system 210 (522). In response, the mail transfer server routes the e-mail originated from the spam e-mail client system 215 to the second e-mail recipient operating the second e-mail client system 210 (524).

If the special mail processing server determines that the special treatment also includes special handling (520, yes), the special mail processing server signals the mail transfer server to apply the special handling to the e-mail (526), and the mail transfer server applies the special handling (528). Applying the special handling may include blocking the e-mail from the spam e-mail client system 215 to the second e-mail client system 210. Alternatively or additionally, the special handling may include bouncing back the incoming e-mail from the spam e-mail client system 215 to the second e-mail client system 210. Alternatively or additionally, the special handling may include deleting the e-mail from the spam e-mail client system 215 to the second e-mail client system 210.

Referring again to FIG. 6, the e-mail notification interface 600 illustrates an example of the first and second presentation styles and is presented to an e-mail recipient (e.g., the second e-mail recipient). The e-mail notification interface 600 is displayed on, for example, the second e-mail client system 210 to inform the second e-mail recipient of the received e-mails.

The e-mail notification interface 600 includes e-mail sender information 605, subject line information 610, and user group feedback information 615. The e-mail sender information 605 identifies the source of the e-mail and/or identity of the sender. For example, it identifies that the second e-mail recipient has received e-mails from Joe Smith, John Venie, and John Sue. The subject line information 610 identifies a subject associated with an e-mail originating from a particular source. For example, the subject line for an e-mail from Joe Smith is regarding a matter number 06975-811001 whereas the subject line for an e-mail from Joe Venie is associated with Viagra.

The e-mail notification interface 600 also includes the user group feedback information 615. The user group feedback information 615 illustrate various presentation styles (e.g., first and second presentation styles) associated with the received e-mails. For example, as shown, one of the e-mails (e.g., an e-mail from Joe Smith) has a first presentation style (e.g., one or more check marks) associated therewith indicating positive comments about either the e-mail source and/or the e-mail content. Additionally, one of the e-mails (e.g., an e-mail from John Sue) has a second presentation style (e.g., one or more X marks) associated therewith indicating negative comments about either the e-mail source and/or the e-mail content. Furthermore, one of the e-mails (e.g., an e-mail from John Venie) has both the first and second presentation styles (e.g., one or more check marks and X marks) associated therewith indicating positive and negative comments about either the e-mail source and/or the e-mail content. In one implementation and as shown, the e-mail recipient is able to view these comments by selecting view comments about the content option 615A and the view comments about the sender option 615B.

FIG. 7 illustrates an e-mail notification interface 700 for received e-mails that were specially treated. In particular, the e-mail notification interface 700 illustrates blocked e-mails. The e-mail notification interface 700 includes sender information 705, subject line information 710, and user group feedback information 715. The sender information 705 and the subject line information 710 are similar to the sender information 605 and the subject line information 710, and, as such, they are not described here in more detail. The user group feedback information 715 is similar to the user group feedback information 615. However, as shown the user group feedback information illustrates that the blocked e-mails each had more than a threshold amount of negative indications associated either with their content or with their source. The user group feedback information 715 also indicates the e-mail recipient that the reason for which the e-mail was blocked. For example, the user group feedback information 715 indicates that the e-mail from victor@yahoo.com has 100 negative indications and therefore was blocked and solicits the e-mail recipient as to whether the e-mail recipient would like to unblock future e-mails from Victor@yahoo.com. For another example, the user group feedback information 715 indicates that the e-mail from Kim@hotmail.com has content similar to an e-mail received 200 negative indications and therefore the e-mail from Kim@hotmail.com was blocked. Along these lines, the user group feedback information 715 solicits the e-mail recipient as to whether the e-mail recipient would like to unblock future e-mails from Kim@hotmail.com or to unblock future e-mails having similar content.

Figure 8:
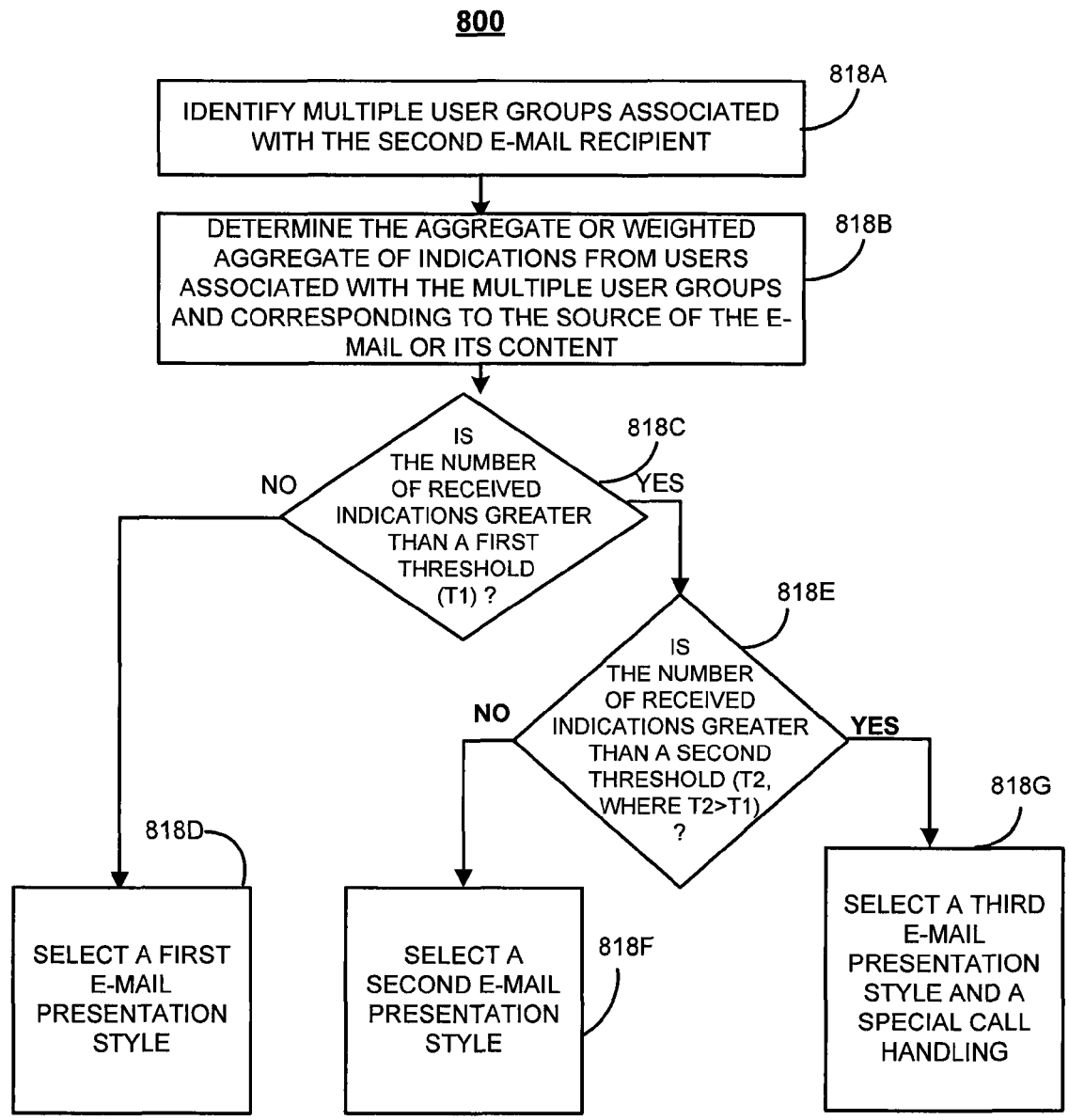
FIG. 8 illustrates an exemplary process used by a special mail processing server to specially treat an e-mail from an e-mail source based on indications received from members of multiple user groups.

Other implementations are contemplated. For example, although the forgoing implementations were described as being applicable to e-mails they are equally applicable to other electronic mails such as, for example, electronic fax mails and/or voice mails. For another example and referring to FIG. 8, instead of specially treating the e-mail from the e-mail source based on the indications received from members of a single user group as illustrated by FIG. 5B, the special mail processing server uses an exemplary process 800 to specially treat the e-mail from the e-mail source based on the indications received from the members of multiple user groups.

Process 800 begins with the special mail processing server identifying multiple user groups associated with the second e-mail recipient (818A). The special mail processing server may access the e-mail data storage 220E to identify the multiple user groups associated with the second e-mail recipient based on personal preferences of the second e-mail recipient. Upon identification of the multiple user groups, the special mail processing server determines the aggregate or weighted aggregate of indications corresponding to the e-mail source and/or the email content and received from the members of the multiple user groups (818B). In one example, the special mail processing server determines the weight aggregate of indications if the preferences of the e-mail recipient indicate that less weight and/or more weight should be assigned to the indications received from members of a particular user group in determining how to specially treat the e-mail. The special mail processing server then performs actions 818C to 818G), which are similar to actions (518C to 518G) illustrated by FIG. 5B, to identify the special treatment based on the total number of received indications from members of the multiple user groups.

Figure 9:
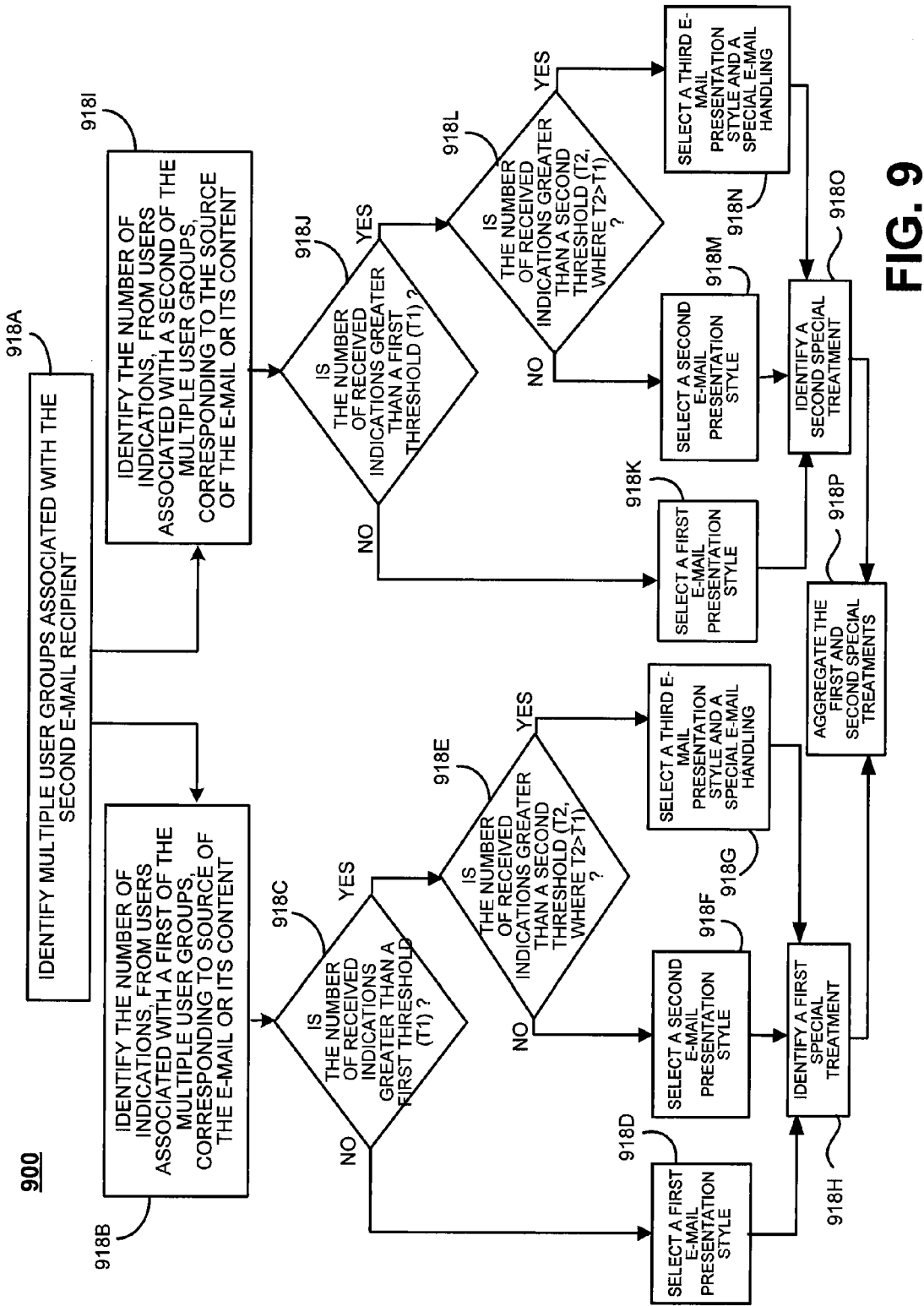
FIG. 9 illustrates an exemplary process used by a special mail processing server to identify multiple special treatments based on indications received from members of multiple user groups.

In another example and referring to FIG. 9, instead of specially treating the e-mail from the e-mail source based the indications received from members of a single user group as illustrated by FIG. 5B, the special mail processing server uses an exemplary process 900 to identify multiple special treatments based on the indications received from members of multiple user groups. Process 900 begins with the special mail processing server identifying the multiple user groups associated with the second e-mail recipient (918A). As noted above, the special mail processing server may access the e-mail data storage 220E to identify the multiple user groups associated with the second e-mail recipient based on personal preferences of the second e-mail recipient. The multiple user groups include a first and a second user groups. The special mail processing server then determines the number of received indications corresponding to the e-mail source and/or email content and received from members of the first e-mail recipient (918B). The special mail processing server then performs actions (918C to 918G), which are similar to actions (518C to 518G) illustrated by FIG. 5B, to determine a first special treatment based on the number of indications received from the members of the first user group (518H).

Similarly, the special mail processing server determines the number of received indications corresponding to the e-mail source and received from members of the second user group (918I). The special mail processing server then performs actions (918J to 918N), which are similar to actions (918C to 918G) illustrated by FIG. 5B, to determine a second special treatment based on the number of indications received from the member of the second user group (918O).

The special mail processing server aggregates the first and second special treatments (918P). As such, in this implementation, the special mail processing server may present a single notification interface to the user that includes a first and second presentation styles. For example, the notification interface indicates that the e-mail source seems to be acceptable because it only has received 5 indications from members of the first user groups. In addition, the notification interface also indicates that the e-mail source should be blocked because it has received more than a threshold amount (e.g., 100 indications) from members of the second user group. Accordingly, the notification interface generated according to this implementation allows the user to view reactions of the members of each of the multiple user groups to the e-mail source.

Figure 10:
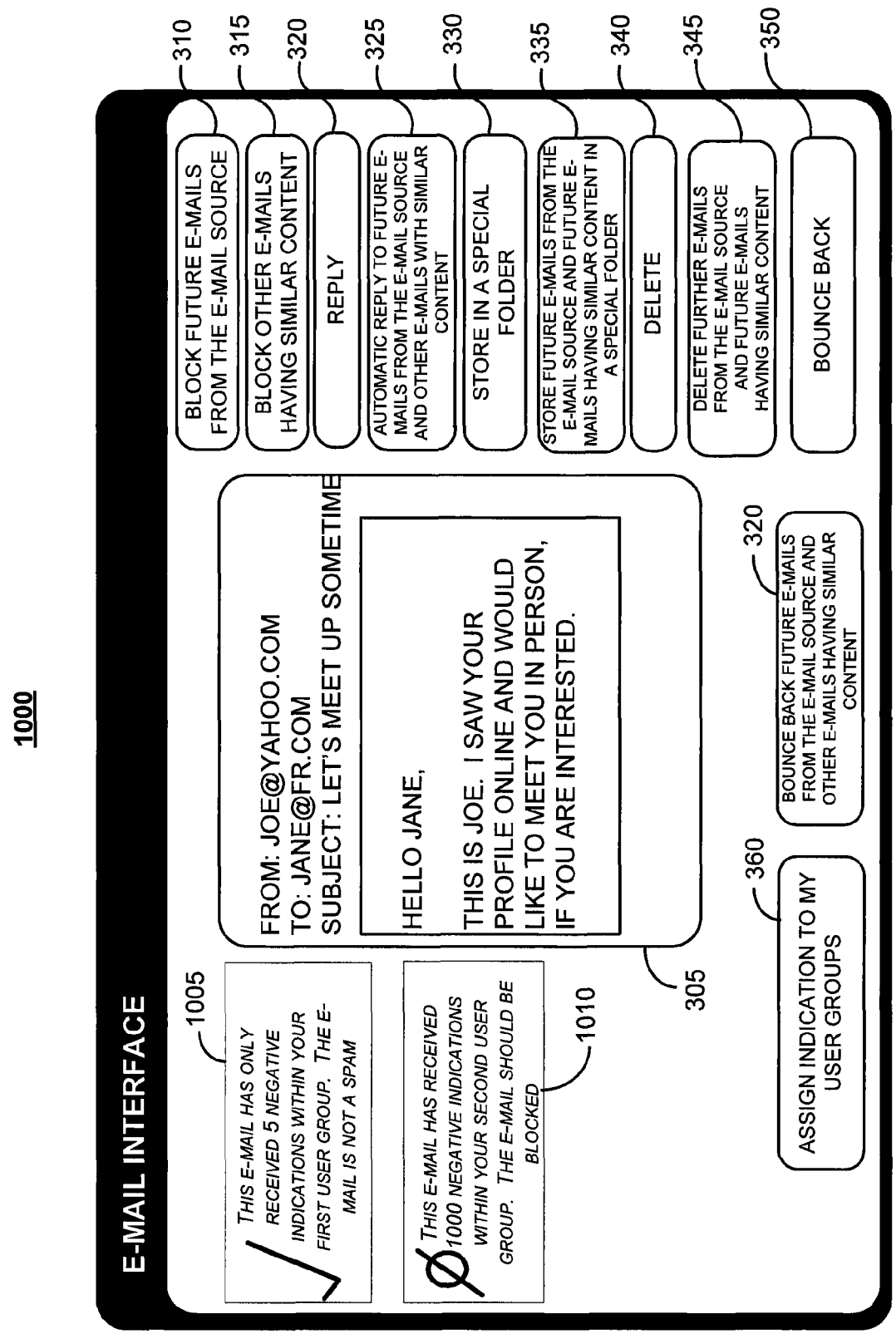
FIG. 10 illustrates an exemplary notification interface generated as a result of the process illustrated by FIG. 9.

Referring to FIG. 10, the e-mail notification interface 1000 illustrates an example of a notification interface generated as a result of process 900. The e-mail notification interface 1000 includes features similar to the e-mail notification interface 300A. In particular, the e-mail notification interface 1000 includes various treatments options each of which were described in detail above with respect to the e-mail notification interface 300A illustrated by FIG. 3A.

The e-mail notification interface 1000 is different from that of the e-mail notification interface 300A in that it also includes messages 1005 and 1010. The message 1005 indicates that the e-mail source seems to be acceptable because it only has received 5 indications from members of the first user groups. As such, the message 1005 suggests to the e-mail is not a spam and the recipient should read and/or reply to the e-mail. The message 1010 indicates that the e-mail source has received more than a threshold amount (e.g., 100 indications) from members of the second user group. As such, the message 1010 suggests to the e-mail recipient to block the e-mail.

Other implementations are contemplated. For example, the special mail processing server provides an e-mail recipient with an option to opt-in or opt-out of user groups for purposes of special treatment of incoming e-mails. In particular, the special mail processing server presents a user interface to the e-mail recipient that allows the e-mail recipient to indicate which one of the user groups of the e-mail recipient should be used for the purposes of specially treating e-mails from e-mail source. In one specific example, the e-mail recipient indicates that only family group's indications should dictate special treatment of incomings e-mails. Alternatively, the e-mail recipient may indicate that only coworker group's indications should be used in influencing the special treatment of incoming e-mails. In yet another example, the e-mail recipient indicates that all user group's indications should be used in influencing the special treatment of incoming e-mails.

In another implementation, the special mail processing server takes into account personal preferences of the e-mail recipient, and, based on the personal preferences, the special mail processing server overrides the special treatment suggested by the users within a user group of the e-mail recipient. For example, if the personal preference of the e-mail recipient indicates that a particular e-mail from an e-mail source is acceptable, the special mail processing server directs the mail transfer server to route the e-mail to the e-mail recipient, regardless of received negative indications, from users within e-mails recipient's user group, suggesting that the e-mail should be, for example, blocked. Additionally or alternatively, the special mail processing server may route the e-mail to the e-mail recipient and may inform the e-mail recipient that the users within the e-mail recipient's user group have indicated a different treatment for the e-mail.

In another implementation and similar to the implementation described above, the special mail processing server monitors e-mail history (instead or in addition to the personal profile) of the e-mail recipient, and, based on the e-mail history, the special mail processing server overrides the special treatment suggested by the users within the e-mail recipient's user group. In keeping with the above-described example, if the e-mail history suggests an e-mail from an e-mail source is acceptable, the special mail processing server routes the e-mail from the e-mail source to the e-mail recipient, regardless of the received negative indications associated with the e-mail, suggesting that the e-mail should be for example blocked. Additionally or alternatively, the special mail processing server may present the e-mail recipient with two options: (1) option to present the e-mail to the e-mail recipient based on the e-mail recipient's pass receptiveness to the e-mail; and (2) specially treat the e-mail according to the received indications from users within the user group of the e-mail recipient.

In another implementation, an e-mail recipient instructs the special mail processing server to specially treat e-mails from an e-mail source based on rules other than the number of votes and/or indications associated with the e-mail source. In one example, the e-mail recipient instructs the special mail processing server to specially treat e-mails from an e-mail source associated with a particular user group. In another example, the e-mail recipient instructs the special mail processing server to specially treat e-mails from an e-mail source associated with an institution that fails to meet certain market standards (e.g. market ratings). As such, in these scenarios, as long as the criteria associated with the e-mail source meets the designated rules, the e-mails from the e-mail source are treated specially regardless of the number of votes and/or indications associated with the e-mail source.

To illustrate, in a scenario where an e-mail recipient indicates that an e-mail from a bank should be accepted if the bank is among the top ten banking institutions, the special mail processing server monitors and back track e-mails directed to the e-mail recipient to identify the entity with which the e-mail source is registered. Upon identifying the entity and realizing that it is a banking entity, the special mail processing server references a rating table to determine whether the bank appears among the top ten banking institutions. If so, the special mail processing server allows the e-mail from the e-mail source to reach the e-mail recipient. Otherwise, the special mail processing server blocks the e-mail or otherwise specially treats the e-mail from the e-mail source.

In another implementation, rather than the user flagging a particular mail as SPAM, the system may perform a frequency check on the received e-mails and identify those that include similar content and exceed the frequency check as SPAM. For example, a message related to a time sharing vacation house in Hawaii may appear in the user's mail box more than a threshold amount of times and thus may be identified as SPAM. The system stores the content associated with this message, identifies the sender of the message, and treats specially the messages having similar content and/or arriving from the same sender. Accordingly, even if the spammer changes its identity, its message would be effectively blocked based on its content.

Although implementations have been described in the e-mail context, the described techniques may be applied in the context of other electronic messaging technologies (e.g., voice messages, instant messages (IM), short message service (SMS) messages, fax messages, pager messages, other text messages, chat messages, etc.). In some configurations, analog to digital conversion may be used to augment filtration and may be coupled with social networking influences on message treatment. For example, in the case of fax blasts for caribbean cruises originating from different caller IDs and with fundamentally different acoustic qualities, a fax messaging service may treat or handle faxes sent as part of the fax blast (e.g., highlight, play different audible alert, isolate, or delete prior to or post deliver) based on converted message content. For instance, the fax messaging service may delete a message that includes a substantially similar fax image based on general filtering rules and social-networking group behaviors.

What is claimed is:

1. A computer-implemented method for using content of an inbound message as a basis for determining how to handle the inbound message, the method comprising the following steps performed by one or more processors:
   receiving a first indication from a first message recipient reflecting a characterization of a first message received by the first message recipient and including first content;
   accessing a user profile associated with the first message recipient, the user profile identifying one or more user groups with which the first message recipient is associated, the one or more user groups including one or more message recipients;
   determining, based on the user profile associated with the first message recipient, that the first message recipient is associated with a user group;
   assigning the first indication to the user group;
   receiving a second indication from a second message recipient reflecting a characterization of a second message received by the second message recipient and including second content, the second message recipient being different from the first message recipient and at least a portion of the second content being similar to a portion of the first content;
   determining that the second message recipient is also associated with the user group;
   assigning the second indication to the user group;
   receiving a third message addressed to a third recipient and including third content, the third recipient being different from the first recipient and the second recipient;
   determining whether the third message recipient is also associated with the user group;
   determining whether the third content includes a portion similar to a portion of the second content;
   when it is determined that the third message recipient is also associated with the user group and that the third content includes a portion sufficiently similar to the portion of the second content:
      associating the first and second indications with the third message; and specially handling the third message based on either or both of the first indication assigned to the user group and the second indication assigned to the user group; and
   when it is determined that the third message recipient is not also associated with the user group, handing the third message without regard for the first and second indications.

2. The method of claim 1 wherein determining whether the third content includes a portion sufficiently similar to the portion of the second content includes:
   comparing data derived from the third content included in the third message to data derived from the portion of the second content; and
   based on comparison results, determining whether the third content includes a portion corresponding the portion of the second content.

3. The method of claim 2 wherein comparing data derived from the third content included in the third message to data derived from the portion of the second content includes:
   computing a first digital signature based on the third content included in the third message;
   computing a second digital signature based on the portion of the second content; and
   comparing the first digital signature to the second digital signature.

4. The method of claim 1 further comprising:
   receiving a fourth message addressed to a fourth recipient and including fourth content, the fourth recipient being different from the first recipient, the second recipient, and the third recipient;
   determining that the fourth message recipient is associated with the user group;
   determining that the fourth content does not include a portion sufficiently similar to the portion of the second content; and
   in response to determining that the fourth content does not include a portion sufficiently similar to the portion of the second content, determining how to handle the fourth message without regard for the first and second indications.

5. The method of claim 1 wherein:
   receiving the first indication from the first message recipient reflecting the characterization of the first message includes receiving a first indication that the first message is spam;
   receiving the second indication from the second message recipient reflecting the characterization of the second message includes receiving a second indication that the second message is spam; and
   determining how to handle the third message based on either or both of the first indication assigned to the user group and the second indication assigned to the user group includes:
      determining that the third message is spam, and determining to filter or block the third message.

6. The method of claim 5 further comprising:
   receiving a fourth message addressed to a fourth recipient and including fourth content that includes a portion sufficiently similar to the portion of the second content, the fourth recipient being different from the first recipient, the second recipient, and the third recipient;
   determining that the fourth message recipient is not associated with the user group; and
   in response to determining that the fourth message recipient is not associated with the user group, determining how to handle the fourth message without regard for the first and second indications including:
      determining that the fourth message is not spam, and determining to deliver the fourth message to the fourth recipient.

7. The method of claim 1 further comprising:
receiving a request from the third recipient to become associated with the user group; and
associating the third recipient with the user group based on the request.

8. The method of claim 1 further comprising:
receiving a request from the third recipient to become disassociated with the user group;
disassociating the third recipient with the user group based on the request;
subsequent to disassociating the third recipient with the user group:
receiving a fourth message addressed to the third recipient and including fourth content that includes a portion sufficiently similar to the portion of the second content;
determining that the third message recipient is not associated with the user group; and
in response to determining that the third message recipient is not associated with the user group, determining how to handle the fourth message without regard for the first and second indications.

9. A computer-implemented method for using content of an inbound message as a basis for determining how to handle the inbound message, the method comprising the following steps performed by one or more processors:
receiving a first indication from a first message recipient reflecting a characterization of a first message received by the first message recipient;
accessing a user profile associated with the first message recipient, the user profile identifying one or more user groups with which the first message recipient is associated, the one or more user groups including one or more message recipients;
determining, based on the user profile associated with the first message recipient, that the first message recipient is associated with a user group;
receiving a second message addressed to a second message recipient, the second message recipient being different from the first message recipient;
determining whether the second message recipient is also associated with the user group;
determining that the second message has content similar to content of the first message;
when it is determined that the second message recipient is also associated with the user group and that the second message has content similar to content of the first message, assigning the first indication to the second message; and
handling the second message based at least on the assigned first indication.

10. The method of claim 9 wherein determining that the second message has content similar to content of the first message includes:
computing a first digital signature based on the content of the first message;
computing a second digital signature based on the content of the second message; and
determining that the first digital signature matches the second digital signature.

11. The method of claim 9 further comprising:
receiving a third message addressed to a third message recipient and including content similar to the content of the second message, the third message recipient being different from the first recipient and the second recipient;
determining that the third message recipient is not associated with the user group; and
in response to determining that the third message recipient is not associated with the user group, determining how to handle the third message without regard to the first indication.

12. A computer system for using content of an inbound message as a basis for determining how to handle the inbound message, the computer system comprising:
a processing system comprising one or more processors;
a memory system comprising one or more computer readable media, the computer readable media storing instructions that, when executed by the processing system, cause the system to perform operations comprising:
accessing a user profile associated with the first message recipient, the user profile identifying one or more user groups with which the first message recipient is associated, the one or more user groups including one or more message recipients;
determining, based on the user profile associated with the first message recipient, that the first message recipient is associated with a user group;
receiving a second message addressed to a second message recipient, the second message recipient being different from the first message recipient;
determining whether the second message recipient is also associated with the user group;
determining that the second message has content similar to content of the first message;
when it is determined that the second message recipient is also associated with the user group and that the second message has content similar to content of the first message, assigning the first indication to the second message; and
handling the second message based on the assigned first indication.

13. The system of claim 12 wherein determining that the second message has content similar to content of the first message includes:
computing a first digital signature based on the content of the first message;
computing a second digital signature based on the content of the second message; and
determining that the first digital signature matches the second digital signature.

14. The system of claim 12, the operations further comprising:
receiving a third message addressed to a third message recipient and including content similar to the content of the second message, the third message recipient being different from the first recipient and the second recipient;
determining that the third message recipient is not associated with the user group; and
in response to determining that the third message recipient is not associated with the user group, determining how to handle the third message without regard to the first indication.

* * * * *